(12) United States Patent
Milirud et al.

(10) Patent No.: US 9,389,981 B2
(45) Date of Patent: Jul. 12, 2016

(54) HIERARCHICAL LIVE GRAPHS FOR PERFORMANCE DATA DISPLAY

(75) Inventors: Michael Milirud, Sammamish, WA (US); Eric D. Brewster, Kirkland, WA (US); Nathan Teeuwen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 13/612,385

(22) Filed: Sep. 12, 2012

(65) Prior Publication Data

US 2014/0075380 A1 Mar. 13, 2014

(51) Int. Cl.
| | |
|---|---|
| G06F 3/048 | (2013.01) |
| G06F 9/44 | (2006.01) |
| G09G 5/02 | (2006.01) |
| G06T 11/20 | (2006.01) |
| G06F 11/32 | (2006.01) |
| G06F 11/34 | (2006.01) |

(52) U.S. Cl.
CPC .......... *G06F 11/323* (2013.01); *G06F 11/3409* (2013.01)

(58) Field of Classification Search
CPC .............. G06F 3/048; G06F 9/44; G09G 5/02
USPC ........................................................ 715/810
See application file for complete search history.

(56) References Cited

U.S. PATENT DOCUMENTS

| | | | | |
|---|---|---|---|---|
| 7,134,093 | B2* | 11/2006 | Etgen et al. ................... 715/786 |
| 7,199,796 | B2* | 4/2007 | Bennett ................ H04L 43/045 |
| | | | | 345/440.1 |
| 7,779,356 | B2* | 8/2010 | Griesmer ..................... 715/711 |
| 7,784,027 | B2* | 8/2010 | Harrison ...................... 717/113 |
| 8,006,195 | B1* | 8/2011 | Woodings ............. G06F 3/0481 |
| | | | | 324/76.19 |
| 8,140,919 | B2* | 3/2012 | Glaser et al. .................... 714/57 |
| 8,175,863 | B1* | 5/2012 | Ostermeyer et al. ........... 703/22 |
| 8,564,623 | B2* | 10/2013 | Cohen et al. .................. 345/634 |
| 8,612,864 | B2* | 12/2013 | Moyne et al. ................. 715/744 |
| 2002/0154173 | A1* | 10/2002 | Etgen .................. G06F 3/04855 |
| | | | | 715/833 |
| 2004/0225955 | A1* | 11/2004 | Ly ................................. 715/500 |
| 2005/0219151 | A1* | 10/2005 | Li et al. ............................ 345/7 |
| 2006/0277395 | A1* | 12/2006 | Fowles ................ G06F 11/3409 |
| | | | | 712/227 |

(Continued)

OTHER PUBLICATIONS

"IBM XIV Mobile Dashboard", retrieved from <http://itunes.apple.com/ua/app/ibm-xiv-mobile-dashboard/id465595012?mt=8 > on Aug. 22, 2012, (Jun. 10, 2012), 2 pages.

(Continued)

*Primary Examiner* — Jennifer To
*Assistant Examiner* — Hugo Molina
(74) *Attorney, Agent, or Firm* — John Jardine; Judy Yee; Micky Minhas

(57) ABSTRACT

A system performance analysis user interface includes a thumbnail portion and an analysis view portion. One or more performance indicator thumbnails and/or data source thumbnails are displayed in the thumbnail portion. Each performance indicator thumbnail displays a live graph identifying performance data of an associated one of multiple performance indicators, and each data source thumbnail displays a live graph of performance of an associated data source. Additional data regarding one or more data sources, such as contribution to usage of the data source by each of multiple contributors, is displayed in the analysis view portion.

20 Claims, 16 Drawing Sheets

(56) References Cited

U.S. PATENT DOCUMENTS

| | | | | |
|---|---|---|---|---|
| 2007/0079243 | A1* | 4/2007 | Leigh et al. | 715/736 |
| 2009/0024911 | A1* | 1/2009 | Margolis | 715/215 |
| 2009/0049123 | A1* | 2/2009 | Dargahi et al. | 709/203 |
| 2010/0125534 | A1* | 5/2010 | Brandes | G06Q 10/04 705/36 R |
| 2010/0185957 | A1* | 7/2010 | Van Ieperen et al. | 715/753 |
| 2010/0287146 | A1* | 11/2010 | Skelton et al. | 707/705 |
| 2011/0010662 | A1* | 1/2011 | Zhang et al. | 715/806 |
| 2012/0023429 | A1* | 1/2012 | Medhi | G06F 11/323 715/772 |
| 2012/0159359 | A1* | 6/2012 | Ehrler et al. | 715/763 |
| 2013/0014006 | A1* | 1/2013 | Abellera et al. | 715/234 |
| 2013/0147828 | A1* | 6/2013 | Vogel | G09G 5/02 345/589 |
| 2014/0013265 | A1* | 1/2014 | Goranka | G06F 11/328 715/772 |

OTHER PUBLICATIONS

"Introduction to the WPA User Interface", retrieved from <http://msdn.microsoft.com/en-us/library/windows/desktop/hh448144.aspx> on Aug. 21, 2012, (May 31, 2012), 2 pages.

"Top 10 Windows 8 Features #5: Live Performance and Reliability Charts", retrieved from <http://www.readwriteweb.com/enterprise/2012/05/top-10-windows-8-features-5-live-performance-and-reliability-charts.php> on Aug. 21, 2012, (May 31, 2012), 9 pages.

"Windows Phone Performance Analysis", retrieved from <http://msdn.microsoft.com/en-us/library/windowsphone/develop/hh202934(v=vs.92).aspx> on Aug. 22, 2012, (Jul. 26, 2012), 6 pages.

Guthrie, "Naglos XI Graph Explorer Component Released", retrieved from <http://labs.nagios.com/2011/06/29/nagios-xi-graph-explorer-component-released> on Aug. 22, 2012, (Jun. 29, 2011), 5 pages.

Heath, Michael T., et al., "ParaGraph: A Performance Visualization Tool for MPI", retrieved from <http://www.csar.illinois.edu/software/paragraph/userguide.pdf>, (Aug. 31, 2003), 45 pages.

Kincaid, Robert et al., "Line Graph Explorer: Scalable Display of Line Graphs Using Focus+Context", *In the Proceedings of the International Conference on Advanced Visual Interfaces*, May 23-26, 2006 Venezia, Italy, retrieved from <http://91-641.wiki.uml.edu/file/view/KincaidLam_line+scale+explorer+-+Scalable+Display+of+Line+Graphs+using+focus+and+conttext.pdf>,(May 23, 2006), 8 pages.

\* cited by examiner

HIERARCHICAL LIVE GRAPHS FOR PERFORMANCE DATA DISPLAY

BACKGROUND

Situations can arise in which a user of a computing device desires to analyze the performance of the computing device. This analysis allows the user to determine how particular programs are running, how particular resources are being accessed, and so forth. The user can take various actions based on this analysis, such as shutting down programs, modifying programs, and so forth. However, given the complexity of typical computing devices, and the numerous programs that can be running on a computing device at any given time, the amount of information available to a user for analysis can be substantial. Having such a large amount of information available to the user can result in a significant amount of time being taken by the user to analyze the data, which can lead to a cumbersome and frustrating experience for the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple user-selectable performance indicator thumbnails are displayed in a first portion of a system performance analysis user interface. Each performance indicator thumbnail is associated with one of multiple performance indicators of a system, and displays a graph identifying performance data for the associated performance indicator. In response to user selection of a performance indicator thumbnail, one or more data source thumbnails associated with the performance indicator are displayed in the first portion of the system performance analysis user interface. Each of the one or more data source thumbnails displays a graph of performance of an associated data source.

In accordance with one or more aspects, one or more data source thumbnails associated with one of multiple performance indicators of a system are displayed in a first portion of a system performance analysis user interface. Each of the one or more data source thumbnails displays a graph of performance data of the associated data source. An analysis view for a data source of a user-selected one of one or more data source thumbnails is displayed in a second portion of the system performance analysis user interface. The analysis view displays contribution to the data source usage by each of multiple contributors, and is synchronized with the user-selected data source graph.

BRIEF DESCRIPTION OF THE DRAWINGS

The same numbers are used throughout the drawings to reference like features.

DETAILED DESCRIPTION

Hierarchical live graphs for performance data display are discussed herein. A system performance analysis user interface includes a thumbnail portion and an analysis view portion. One or more performance indicator thumbnails are displayed in the thumbnail portion, each performance indicator thumbnail displaying a live graph identifying performance data of an associated one or more of multiple resources. One or more data source thumbnails are also displayed in the thumbnail portion, each data source thumbnail displaying a live graph of performance of an associated data source. Additional data regarding one or more data sources, such as contribution to usage of the data source by each of multiple contributors, is displayed in the analysis view portion.

Figure 1:
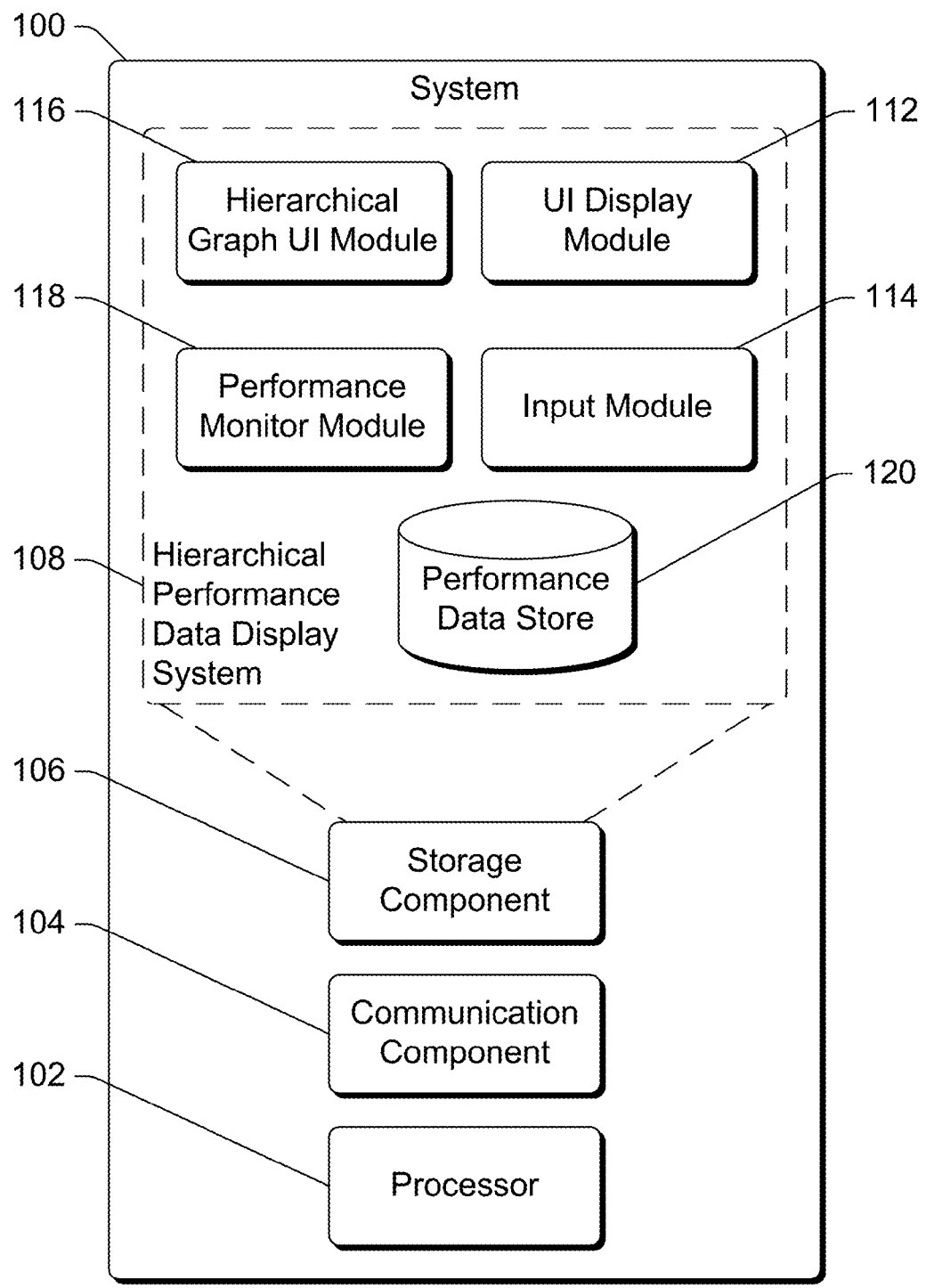
FIG. 1 is a block diagram illustrating an example system implementing the hierarchical live graphs for performance data display in accordance with one or more embodiments.

FIG. 1 is a block diagram illustrating an example system 100 implementing the hierarchical live graphs for performance data display in accordance with one or more embodiments. System 100 can be implemented by one or more of a variety of different types of devices, such as a physical device or a virtual device. For example, system 100 can be implemented by a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. System 100 can also be implemented by a virtual device, such as a virtual machine running on a physical device. A virtual machine can be run on any of a variety of different types of physical devices (e.g., any of the various types listed above). Thus, system 100 may range from a full resource system with substantial memory and processor resources (e.g., personal computers, game consoles) to a low-resource system with limited memory and/or processing resources (e.g., traditional set-top boxes, hand-held game consoles).

System 100 includes a processor 102, a communication component 104, and a storage component 106. Storage component 106 stores instructions that are executed by processor 102, and can be any one or more of a variety of different storage media, such as a magnetic disk, optical disc, Flash memory, random access memory (RAM), and so forth. Processor 102 is also referred to as a central processing unit (CPU) and can have any number of cores, and system 100 can include any number of processors 102. Communication component 104 is an interface allowing system 100 to communicate with various other devices in various manners, such as via a wired and/or wireless network (the Internet, a local area network (LAN), a public telephone network, an intranet, other public and/or proprietary networks, combinations thereof, etc.), via other wired and/or wireless connections (e.g., universal serial bus (USB), wireless USB, etc.), and so forth. System 100 can include any number of communication components 104.

Storage component 106 includes a hierarchical performance data display system 108 including user interface (UI) display module 112, an input module 114, a hierarchical graph UI module 116, a performance monitor module 118, and a performance data store 120. Each module 112-118 can be implemented in software and/or firmware, including instructions which can be executed by processor 102. Alternatively, although illustrated as included in storage component 106, one or more modules 112-118 can be implemented at least in part in hardware. Although specific modules are illustrated in FIG. 1, it should be noted that additional modules can be included in system 100. Additionally, it should be noted that the functionality of multiple modules illustrated in FIG. 1 can be combined into a single module, and/or the functionality of one or more modules illustrated in FIG. 1 can be separated into multiple modules.

UI display module 112 generates, manages, and/or outputs a user interface for system 100. For example, presentation module 112 manages outputting data for graphs (from module 116) for display by a display device. System 100 can include the display device, or alternatively UI display module 112 can transmit signals to a separate display device for display of the data.

A user of system 100 can provide various user inputs, such as in response to data displayed by UI display module 112. User inputs can be provided in a variety of different manners, such as by pressing one or more keys of a keypad or keyboard of system 100, pressing one or more keys of a controller (e.g., remote control device, mouse, trackpad, etc.) of system 100, pressing a particular portion of a touchpad or touchscreen of system 100, making a particular gesture on a touchpad or touchscreen of system 100, and/or making a particular gesture on a controller (e.g., remote control device, mouse, trackpad, etc.) of system 100. User inputs can also be provided via other physical feedback input to system 100, such as tapping any portion of system 100, an action that can be recognized by a motion detection component of system 100 (such as shaking system 100, rotating system 100, etc.), bending or flexing a portion of system 100, and so forth. User inputs can also be provided in other manners, such as via voice or other audible inputs to a microphone, via motions of hands or other body parts observed by an image capture device, and so forth. These user inputs allow a user to interact with system 100, such as by inputting particular characters or symbols, selecting particular buttons or menu options, dragging and dropping various descriptions or images, and so forth.

Performance monitor module 118 monitors various performance aspects or performance data sources, also referred to as simply data sources, of system 100, collecting and storing performance data in performance data store 120. The performance data generally refers to data describing the manner in which system 100 is operating. The performance data can describe the manner in which hardware, software, firmware, and/or combinations thereof of system 100 is operating. For example, the performance data can describe the manner in which processor 102 is operating, the manner in which communication component 104 is operating, the manner in which storage component 106 is operating, the manner in which an operating system of system 100 is operating, and so forth.

The performance data includes data for one or more attributes of each of one or more data sources of system 100. A data source of system 100 refers to the usage and/or operation of a particular resource of system 100 (e.g., particular hardware, software, firmware, and/or combination thereof of system 100). For example, data sources of system 100 include usage of processor 102, usage of storage component 106, usage of communication component 104, which processes are running on system 100, a power source of system 100, memory faults generated on system 100, which windows displayed by UI display module 112 are in view, and so forth.

Each data source of system 100 has one or more associated attributes that describe the usage and/or operation of the data source, and different data sources can have different attributes. For example, a processor usage data source may have attributes that are the different processes being run on system 100 and how much (e.g., what percentage) of the processor capacity is used by each of the processes. By way of another example, a disk usage data source may have attributes that are the types of operations performed on a disk (e.g., read operations, write operations, flush operations), and the size and/or duration of the operations performed. By way of yet another example, a memory usage data source may have attributes that are the different processes being run on system 100 and how much (e.g., how many memory pages or what percentage of) memory is used by each of the processes, how many page faults are generated by each of the processes, and so forth. By way of still another example, a windows displayed data source may have attributes that are the different windows created for the different processes being run on system 100 and for each of the windows whether the window is being displayed.

Performance monitor module 118 collects data regarding the data sources of system 100 at regular or irregular intervals, such as every threshold amount of time (e.g., every microsecond, every nanosecond, etc.), in response to particular events (e.g., a process being created, a process being terminated, etc.), and so forth. The performance data can be collected in any of a variety of conventional manners. Module 118 stores the collected data as performance data in performance data store 120, and includes an indication of the time when the data was collected. The indication can be stored explicitly or inherently in the data structure used to store the performance data. For example, every microsecond data indicating which processes used the processor during the previous microsecond, data indicating how much data was read from and/or written to a storage device during the previous microsecond, data indicating which windows were displayed during the previous microsecond, and so forth can be stored in performance data store 120.

Various operations can also optionally be performed on the performance data by module 118, and the results of those operations can be included as part of the performance data. For example, a calculation to determine a percentage of the processor capacity being used by each of multiple processes can be made by module 118 based on the performance data. Alternatively, such calculations can be performed by other modules (e.g., hierarchical graph UI module 116).

The performance data stored in performance data store 120 can be accessed by hierarchical graph UI module 116 to generate graphical displays of the performance data as discussed in more detail below. Performance data store 120 can be accessed directly by module 116, or via another module (such as performance monitor module 118).

Hierarchical graph UI module 116 provides a user interface to display the performance data recorded by performance monitor module 118 graphically via UI display module 112. The user of system 100 can provide various inputs to select a type of information displayed in the graph, a time range for which the performance data is displayed, and so forth as discussed in more detail below. Displaying the performance data graphically refers to displaying the performance data using one or more graphs and/or charts. Any of a variety of different types of graphs and/or charts can be used to display the performance data graphically, such as line graphs, stacked line graphs, bar graphs, stacked bar graphs, Gantt charts, and so forth.

Hierarchical graph UI module 116 provides a user interface to display the performance data in a hierarchical manner. The hierarchical display of performance data allows a user to view graphs of the performance data in a top-down manner, allowing a user of system 100 to readily identify resources, collections of resources, and/or data sources that can be causing a problem and/or are of a concern to the user.

Figure 2:
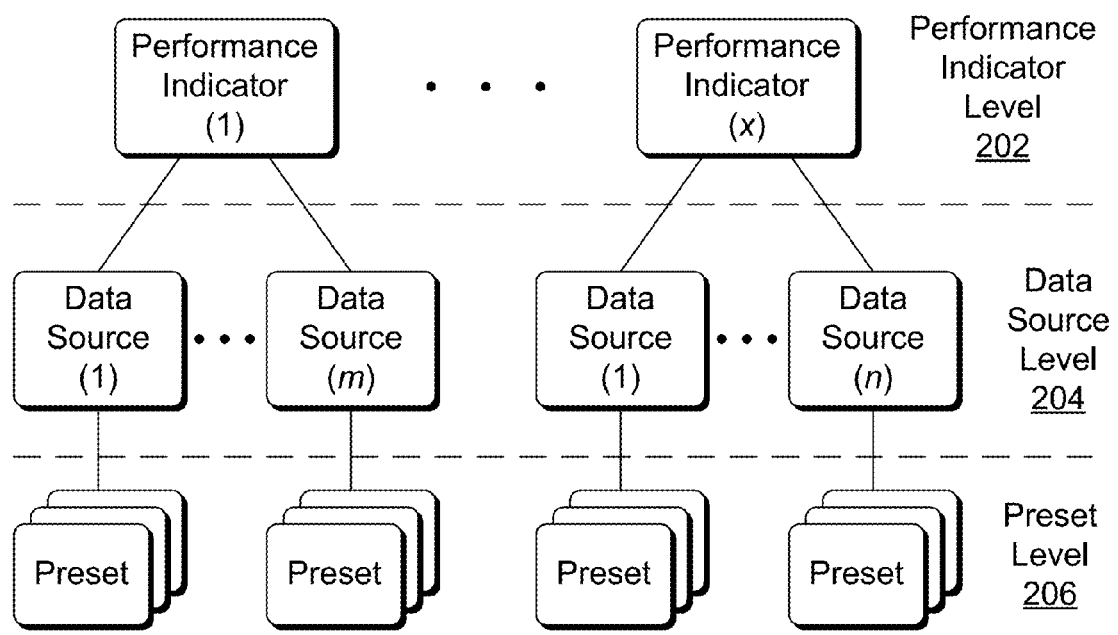
FIG. 2 illustrates an example hierarchy for performance data display in accordance with one or more embodiments.

FIG. 2 illustrates an example hierarchy 200 for performance data display in accordance with one or more embodiments. Hierarchy 200 includes a performance indicator level 202, a data source level 204, and a preset level 206. Performance indicator level 202 includes multiple (x) performance indicators for a system. Each performance indicator corresponds to one or more resources, and performance data regarding the usage of those resources is collected as discussed above. A system can include various different resources, such as computation (e.g., one or more processors, one or more processor cores, etc.), storage (e.g., one or more hard disks, one or more optical discs, one or more remote storage devices, etc.), memory (e.g., random access memory, flash memory, etc.), power (e.g., one or more batteries, one or more AC power sources, one or more backup power sources, etc.), graphics (e.g., one or more graphics processors, one or more graphics adapters, etc.), communications (e.g., wireless communications, wired network communications, etc.), input (e.g., touchscreens, microphones, cameras, etc.), and so forth. Performance indicator level 202 can also include a system activity performance indicator that represents logical activity within the system that is not specific to any particular resource. The system activity performance indicator can include particular operations or tasks being performed, particular processes or threads that are executing, process lifetimes, thread lifetimes, image lifetimes, window in focus marks, generic events, and so forth.

Each performance indicator at performance indicator level 202 corresponds to or is associated with a collection of one or more data sources, and can also be referred to as a category. The data sources in a particular collection can be data sources for a single resource or different resources. For example, a computation performance indicator may include data sources of a computation resource, and a system activity performance indicator may include data sources of a computation resource as well as a storage resource.

Data source level 204 includes multiple data sources for each performance indicator in level 202. Different performance indicators can have the same or different numbers of data sources. Each data source is a source of performance data for an associated performance indicator, and can have different attributes as discussed above. Each performance indicator can have various different data sources. For example, the system activity performance indicator may have data sources such as device input/output, stacks, marks, threads, processes, window in focus, images, generic events, and so forth. By way of another example, the computation performance indicator may have CPU usage-sampled (or CPU usage-sample), CPU usage-precise, deferred procedure call (DPC)/interrupt service routine (ISR), and so forth. By way of another example, a storage performance indicator may have data sources such as disk usage, file input/output usage, registry usage, and so forth. By way of another example, a memory performance indicator may have data sources such as handles, memory utilization, virtual total commit count, hard faults, and so forth. By way of another example, a power performance indicator may have data sources such as CPU frequency, CPU idle states, and so forth. By way of another example, a graphics performance indicator may have data sources including GPU (graphics processing unit) usage. By way of another example, a networking or communications performance indicator may have data sources including network usage. It is to be appreciated that these examples of data sources are merely examples, and that various other data sources can be included for the various performance indicators.

Preset level 206 includes multiple different presets for each data source in level 204. Different data sources can have the same or different presets. Each preset refers to the one or more attributes for each data source. Different data sources can have different attributes as discussed above, and each preset refers to one of those different attributes.

Although three levels are illustrated in hierarchy 200, it should be noted that one or more additional levels can also be included in hierarchy 200. Each additional level includes multiple different aspects or characteristics of a higher level in hierarchy 200. For example, an additional level that includes multiple different aspects or characteristics that contribute to each preset in preset level 206 can be included in hierarchy 200.

Various graphs are discussed herein, including graphs in thumbnails of portion 302 as well as other graphs (e.g., graphs in analysis view portion 304, graphs in additional windows, and so forth). Each graph displays performance data for the associated performance indicator, data source, and/or preset. As the performance data for the performance indicator, data source, and/or preset changes, the graph changes to reflect the changes to the performance data. The performance data changing includes new performance data being obtained or determined, and also includes the portion of a time range of performance data that a user desires to view being changed (e.g., in response to a user selection of a region of interest). Thus, the graphs discussed herein are also referred to as live graphs due to the graphs changing as the performance data changes. For example, rather than being simply an indication of a type of graph, thumbnails display graphs of the performance data as new performance data is collected, as the portion of a time range of performance data that a user desires to view is changed, and so forth.

Figure 3:
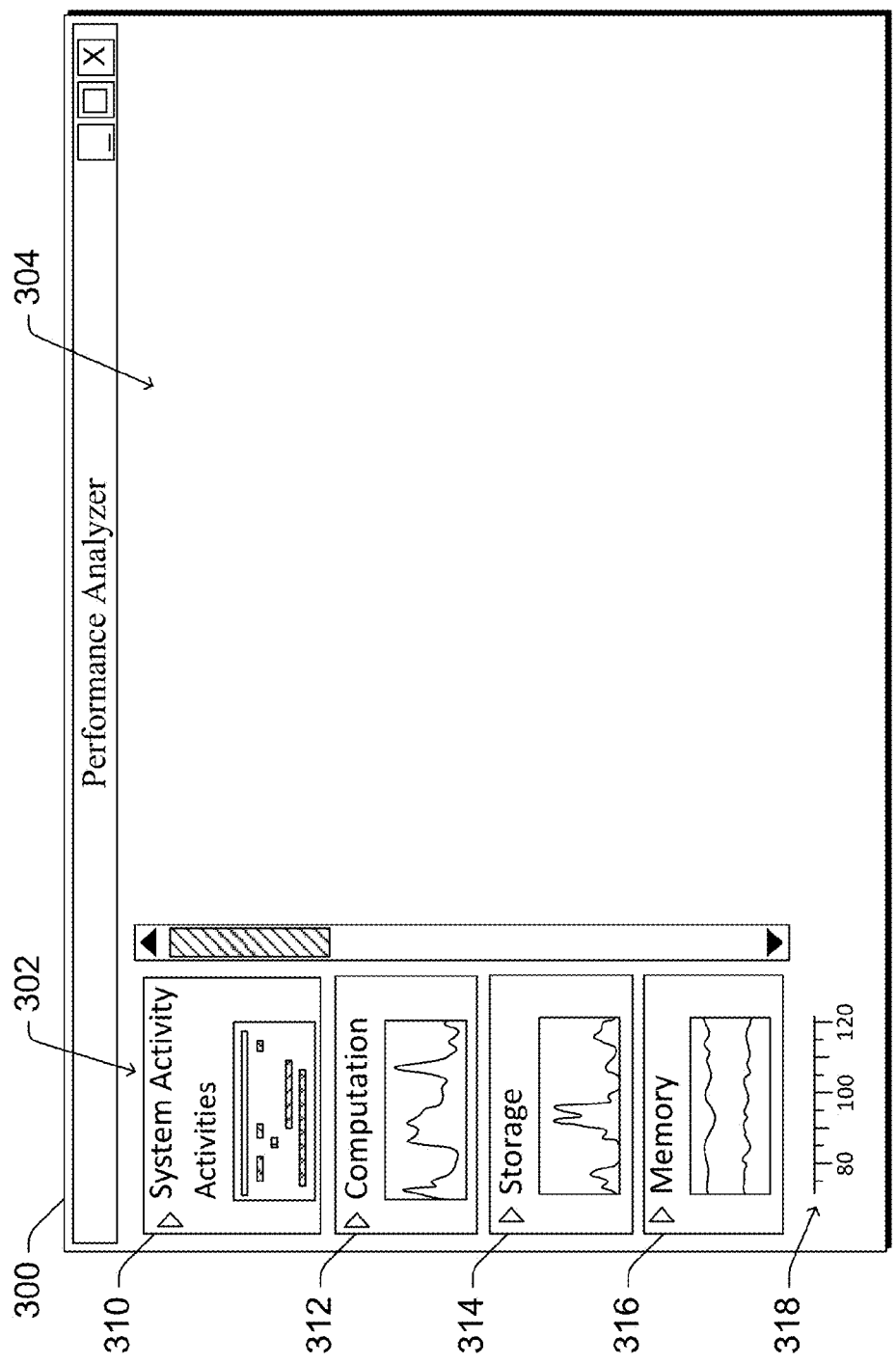
FIGS. 3, 4, 5, 6, 7, 8, 9, 10, 11, 12, 13, and 14 illustrate example displays implementing the hierarchical live graphs for performance data display in accordance with one or more embodiments.

FIG. 3 illustrates an example display 300 implementing the hierarchical live graphs for performance data display in accordance with one or more embodiments. Display 300 illustrates a system performance analysis user interface (UI) that includes a thumbnail portion 302 and an analysis view portion 304. The thumbnail portion 302 includes multiple thumbnails for different performance indicators, data sources, and/or presets. In the illustrated example, thumbnail portion 302 includes performance indicator thumbnails including a system activity thumbnail 310, a computation (CPU) thumbnail 312, a storage thumbnail 314, and a memory thumbnail 316, although thumbnails for various different performance indicators can be included in thumbnail portion 302. Additionally, in situations in which more thumbnails are available than can be displayed at one time, the user can optionally scroll through the various thumbnails using various input mechanisms (e.g., using a scroll bar, using a gesture to scroll through a list, and so forth).

In one or more embodiments, the performance indicators for which performance indicator thumbnails are displayed in thumbnail portion 302 are user selectable. Various different mechanisms can be used to allow a user to select a performance indicator, such as voice input, selection of a performance indicator from a context menu or pull-down menu, text input, dragging and dropping an icon or other representation of a performance indicator onto a particular portion of the UI, and so forth. A user can provide various inputs as discussed above to identify one or more performance indicators for which thumbnails are to be displayed in portion 302.

A thumbnail refers to a tile, button, or other object displayed in a user interface. A thumbnail can be associated with a performance indicator and referred to as a performance indicator thumbnail, associated with a data source and referred to as a data source thumbnail, or associated with a preset and referred to as a preset thumbnail. The performance indicator thumbnail typically includes, but need not include, a text description of the associated performance indicator (e.g., computation, storage, etc.). A performance indicator thumbnail also includes a graph of performance data based on the data sources associated with the performance indicator.

The graph of performance data included in each performance indicator thumbnail in portion 302 identifies performance data for the performance indicator, and is also referred to as a summary of the performance data for the performance indicator. The identification or summary of the performance data displayed in a performance indicator thumbnail graph can be determined in different manners. In one or more embodiments, the performance data for one of the data sources of the performance indicator is displayed in the performance indicator thumbnail graph. This one data source can be determined in different manners, such as selected by a user or administrator of the system, selected by a designer or distributor of the system, and so forth. Alternatively, the data for multiple ones of the data sources of the performance indicator can be averaged, added, or otherwise combined to determine the performance data displayed in a performance indicator thumbnail graph. Alternatively, the performance data for multiple ones of the data sources of the performance indicator can be displayed in the performance indicator thumbnail graph (e.g., as separate lines as illustrated in the graph of memory thumbnail 316), and so forth.

For the system activity thumbnail, the performance data refers to whether particular logical activities are being performed in the system. This logical activity can be particular operations or tasks being performed that may involve multiple resources, particular processes or threads that are executing that may utilize multiple resources, and so forth.

Each performance indicator thumbnail graph displays performance data for the performance indicator associated with or corresponding to the performance indicator thumbnail. The performance indicator thumbnail graph is also referred to as a live graph—rather than being simply an indication of a type of performance indicator or performance data, the performance indicator thumbnail displays a graph of the performance data as the performance data changes.

The time range for the performance data displayed in the performance indicator thumbnail graphs is illustrated as time range 318. Although time range 318 is illustrated at the bottom of portion 302, time range 318 can alternatively be displayed in other locations (e.g., above thumbnail 310, between two thumbnails in portion 302). Thus, in the illustrated example of FIG. 3, the time range for the performance data displayed in the thumbnail graphs is from approximately 70 to 122.

It should be noted that the time range can change. For example, as the system operates and new performance data is collected, the time range can change to correspond to the times of the most recently collected performance data. Additionally, the user can select any time range that he or she desires. The user can select a time range in various manners, such as entering particular numbers specifying the time range (e.g., 70 and 122), selecting a time range from another chart or timeline, selecting a time range from a menu, moving a scroll bar, and so forth. In response to selection of a particular time range, the thumbnail graphs are updated to reflect the performance data in the selected time range. Additionally, in response to selection of a particular time range, the performance data for the appropriate one or more data sources are displayed in analysis view portion 304 as discussed in more detail below.

In one or more embodiments, the performance indicator thumbnails are color coded so that performance indicator thumbnails associated with different performance indicators have different colors. Alternatively, other techniques can be used to distinguish the performance indicator thumbnails associated with different performance indicators from one another. For example, different sized performance indicator thumbnails can be used, different fonts for text descriptions of performance indicator thumbnails can be used, performance indicator thumbnails having different geometric shapes (e.g., rectangle, circle, triangle, etc.) can be used, and so forth.

A user input selecting one or more performance indicator thumbnails can be received. Selection of a performance indicator thumbnail can be received via any of a variety of different user inputs as discussed above. For example, the user can touch or tap a performance indicator thumbnail in portion 302, the user can provide a voice input identifying a performance indicator thumbnail in portion 302, the user can touch or tap a geometric shape such as a triangle adjacent to the text description of a performance indicator thumbnail in thumbnail portion 302, and so forth. In response to user selection of a performance indicator thumbnail in thumbnail portion 302, one or more data source graphs associated with the selected performance indicator thumbnail are displayed in data source thumbnails in thumbnail portion 302.

Figure 4:
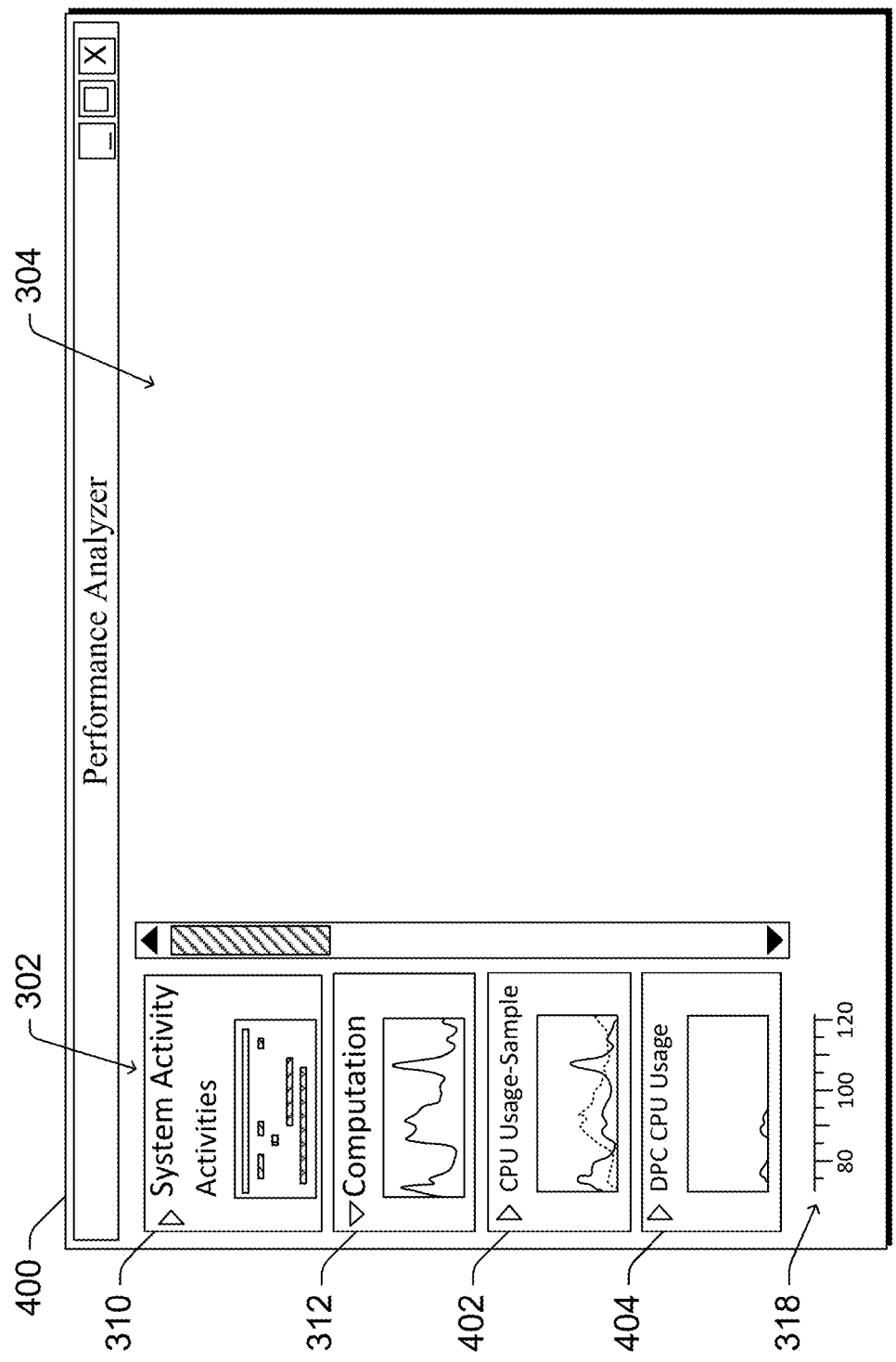

FIG. 4 illustrates an example display 400 implementing the hierarchical live graphs for performance data display in accordance with one or more embodiments. Display 400 illustrates a system performance analysis UI that includes a thumbnail portion 302 and an analysis view portion 304, analogous to the discussions above. In the example of FIG. 4, the computation thumbnail 312 has been selected and multiple thumbnails for data sources associated with the computation performance indicator are displayed. In the illustrated example, thumbnail portion 302 includes performance indicator thumbnails including a system activity thumbnail 310 and a computation (CPU) thumbnail 312, and data source thumbnails including a CPU usage-sample thumbnail 402 and a DPC CPU usage thumbnail 404, although thumbnails for various different performance indicators and/or data sources can be included in thumbnail portion 302. Additionally, in situations in which more thumbnails are available than can be displayed at one time, the user can optionally scroll through the various thumbnails using various input mechanisms (e.g., using a scroll bar, using a gesture to scroll through a list, and so forth).

It should be noted that in thumbnail portion 302 the performance indicator thumbnails (and/or graphs displayed in the performance indicator thumbnails) can be displayed in the same manner as the data source thumbnails (and/or graphs displayed in the data source thumbnails), or in a different manner. For example, the performance indicator thumbnails (and/or graphs displayed in the performance indicator thumbnails) can be displayed as taller than, as wider than, with different fonts than, and so forth the data source thumbnails (and/or graphs displayed in the data source thumbnails).

In one or more embodiments, the data sources for which data source thumbnails are displayed in thumbnail portion 302 are user selectable. Various different mechanisms can be used to allow a user to select a data source, such as voice input, selection of a data source from a context menu or pull-down menu, text input, dragging and dropping an icon or other representation of a data source onto a particular portion of the UI, and so forth. A user can provide various inputs as discussed above to identify one or more data sources for which thumbnails are displayed in portion 302.

Thus, thumbnail portion 302 displays thumbnails associated with data sources as well as (or alternatively in place of) thumbnails associated with performance indicators. A user input selecting one or more thumbnails associated with a performance indicator can be received, and in response to the user input thumbnails for the data sources associated with that performance indicator are displayed. Similarly, display of the thumbnails for data sources associated with the performance indicator can cease in response to a subsequent user input selecting the thumbnail. This subsequent user selection of the thumbnail can be received via any of a variety of different user inputs as discussed above. Thus, the user can readily switch between having thumbnails for data sources displayed and not displayed.

Each thumbnail associated with a data source refers to a tile, button, or other object displayed in a user interface as discussed above. The thumbnail typically includes, but need not include, a text description of the associated data source (e.g., CPU usage-sample, DPC CPU usage, etc.). A thumbnail also includes a graph of performance data of the associated data source.

The graph of performance data included in each data source thumbnail in portion 302 is an indication of the performance data for the data source, and this performance data displayed in a data source thumbnail graph can be determined in different manners. In one or more embodiments, the performance data displayed in a data source thumbnail graph is the performance data for one or more of the different attributes of the data source (e.g., different processes being run, different types of operations performed on a disk, and so forth). Alternatively, the performance data displayed in a data source thumbnail graph can be the average, sum, or other result of combining the performance data for one or more attributes of the data source. For example, the attribute for a data source can be a percent of processor capacity being used, and that performance data for the different processes can be added together and displayed in the CPU usage-sample thumbnail graph as the percent of processor capacity being used. Alternatively, the performance data for one of the attributes for a data source (e.g., one of the processes contributing to CPU usage) can be displayed in the data source thumbnail graph. This one attribute can be determined in different manners, such as selected by a user or administrator of the system, selected by a designer or distributor of the system, and so forth.

Each data source thumbnail graph displays performance data for the data source associated with or corresponding to the data source thumbnail. As the performance data for the data source changes, the data source thumbnail graph changes to reflect the changes to the performance data. Thus, the data source thumbnail graph is also referred to as a live graph—rather than being simply an indication of a type of data source or performance data, the data source thumbnail graph displays a graph of the performance data as the performance data changes.

The time range for the performance data displayed in the data source thumbnail graphs and performance indicator thumbnail graphs is illustrated as time range 318. Although time range 318 is illustrated at the bottom of portion 302, time range 318 can alternatively be displayed in other locations as discussed above.

In one or more embodiments, the data source thumbnails are color coded so that data source thumbnails associated with data sources that are associated with different performance indicators have different colors. For example, each performance indicator (e.g., computation, storage, memory, etc.) can be associated with a different color, and each performance indicator thumbnail as well as each data source thumbnail for a data source associated with the performance indicator can be displayed with the color (or different shades of the color) associated with that performance indicator. Alternatively, other techniques can be used to distinguish the data source thumbnails associated with different performance indicators from one another. For example, different sized data source thumbnails can be used, different fonts for text descriptions of data source thumbnails can be used, data source thumbnails having different geometric shapes (e.g., rectangle, circle, triangle, etc.) can be used, and so forth. Alternatively, the data source thumbnails can be color coded so that data source thumbnails associated with different data sources have different colors (or are otherwise displayed in different manners to distinguish thumbnails corresponding to different data sources from one another).

A user input selecting one or more data source thumbnails can be received. Selection of a data source thumbnail can be received via any of a variety of different user inputs as discussed above. For example, the user can touch or tap a data source thumbnail in portion 302, the user can provide a voice input identifying a data source thumbnail in portion 302, the user can touch or tap a geometric shape such as a triangle adjacent to the text description of a data source thumbnail in thumbnail portion 302, and so forth. In response to user selection of a data source thumbnail in thumbnail portion 302, one or more graphs associated with the selected data source thumbnail are displayed in analysis view portion 304.

Analysis view portion 304 displays additional data associated with a data source thumbnail in portion 302 (e.g., a user-selected data source thumbnail). This additional data includes an identification of the contributors to usage of a particular data source and/or an identification of how those contributors contribute to usage of a particular data source. These contributors can vary based on the type of data source and/or performance indicator, and can be for example processes, threads, input/output operations, and so forth. Depending on the data source and/or performance indicator, each contributor can be an attribute of the data source (e.g., a process executing on a processor, types of operations performed on a disk, and so forth).

Additionally, in one or more embodiments the monitoring of performance data may be turned on and off. The monitoring can be turned off in response to a request from a user or administrator, in response to a request from another component or module of the system, and so forth. The monitoring of performance data is also referred to as tracing, thus turning off the monitoring is also referred to as tracing being off. In situations in which the monitoring of performance data is turned off during a time range for which performance data is displayed in the thumbnail graphs, an indication that monitoring is turned off can be displayed in the thumbnail graphs and/or data source graphs in thumbnail portion 302. For example, the thumbnail graphs and/or data source graphs can be shaded out and a "monitoring off" or "tracing off" label displayed during the times when the monitoring is turned off. Thus, in addition to the thumbnail graphs and data source graphs displaying graphs of the performance data as the performance data changes, the thumbnail graphs and data source graphs can also display indications of times during which no performance data was being recorded.

Figure 5:
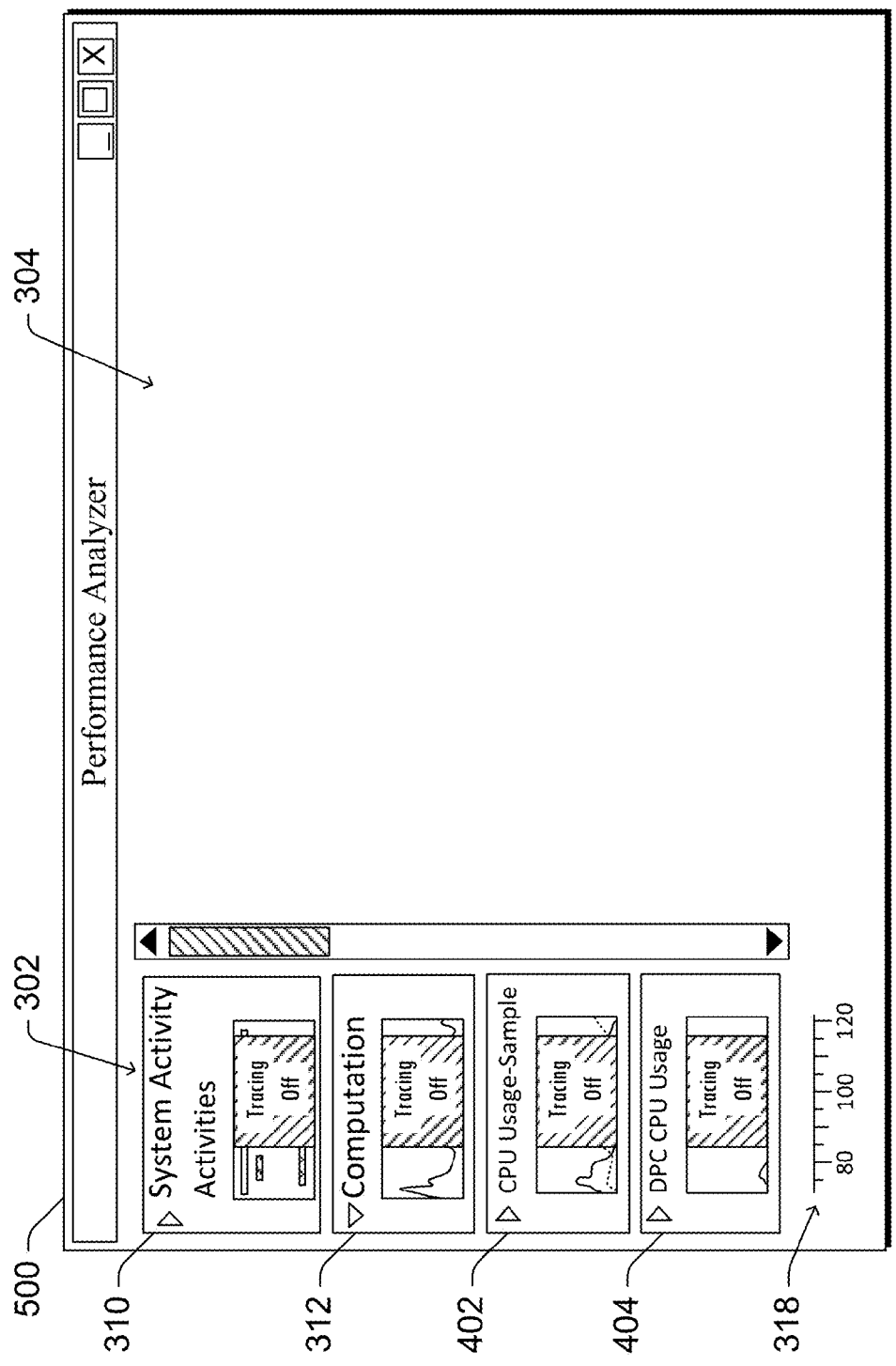

FIG. 5 illustrates an example display 500 implementing the hierarchical live graphs for performance data display in accordance with one or more embodiments. Display 500 illustrates a system performance analysis UI that includes a thumbnail portion 302 and an analysis view portion 304, analogous to the discussions above. In the example of FIG. 5, the monitoring of performance data is turned off during a time range for which performance data is displayed in the thumbnail graphs and data source graphs in thumbnail portion 302. This time range for which monitoring of performance data is turned off is illustrated with the label "tracing off" in a shaded area (illustrated with cross-hatching) in the thumbnail and data source graphs.

Figure 6:
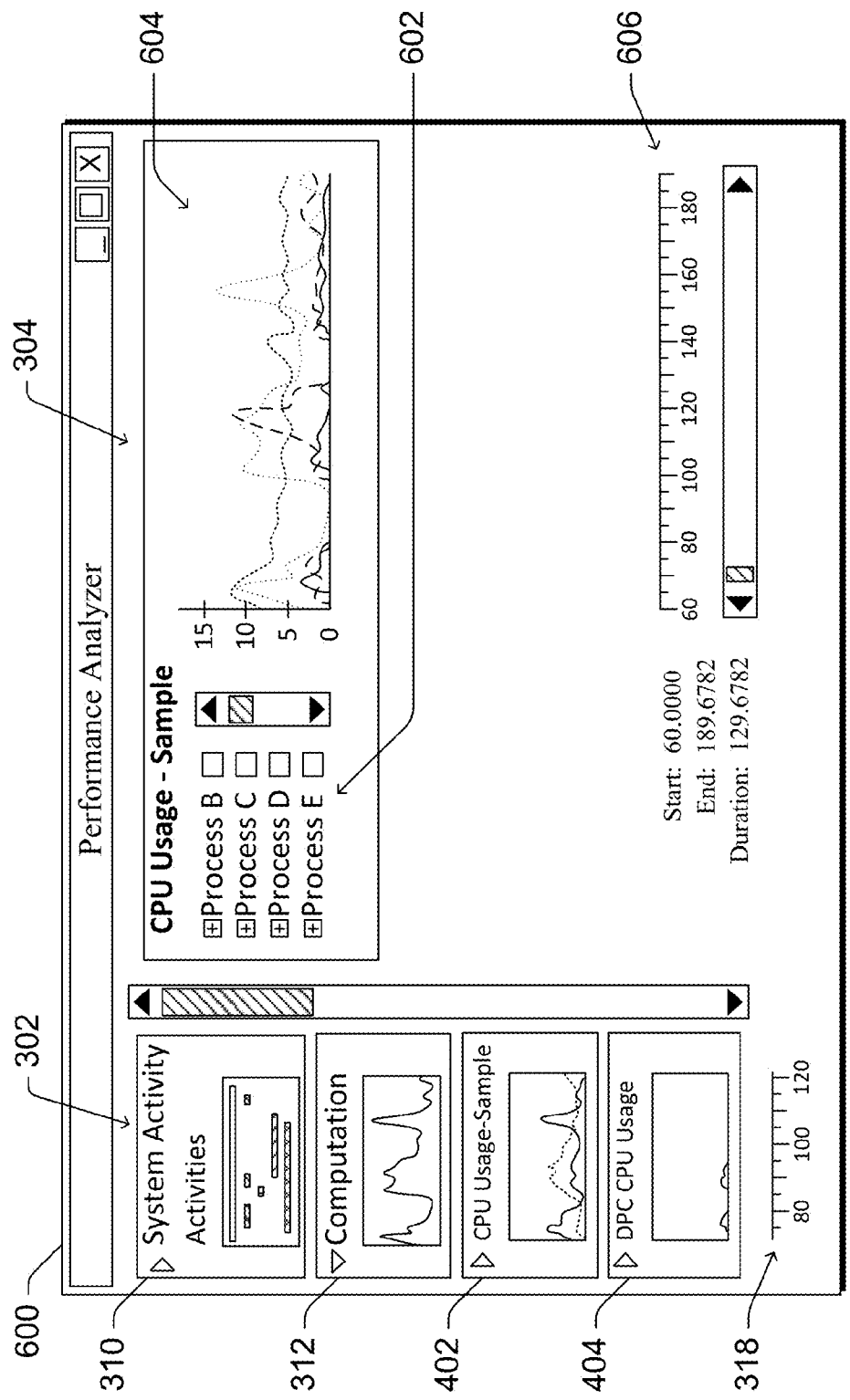

FIG. 6 illustrates an example display 600 implementing the hierarchical live graphs for performance data display in accordance with one or more embodiments. Display 600 illustrates a system performance analysis UI that includes a thumbnail portion 302 and an analysis view portion 304, analogous to the discussions above. In the example of FIG. 6, a data source thumbnail that is the CPU usage-sample thumbnail 402 has been selected and various additional data associated with the CPU usage-sample thumbnail 402 is displayed in analysis view portion 304.

The performance data displayed in the various graphs in analysis view portion 304 and in the thumbnails of thumbnail portion 302 can be synchronized. The display of the performance data being synchronized refers to the performance data over the same time range being displayed concurrently in the different graphs. Alternatively, the performance data for different time ranges can be displayed in portions 304 and 302, allowing the user to view one or more graphs based on one time range in thumbnail portion 302, and one or more graphs based on one or more different time ranges in analysis view portion 304.

In the illustrated example, analysis view portion 304 includes a legend 602 and a graph 604. Legend 602 identifies the process running on the computing device, such as by process name or other process identifier. Four processes are illustrated (Process B, Process C, Process D, and Process E), although it should be noted that any number of processes can be running on the computing device. A scroll bar is included in legend 602, allowing the user to scroll through the various process identifiers. The process identifiers can be displayed in legend 602 in various orders, such as in order from highest percentage of CPU usage to lowest percentage of CPU usage (or vice versa), alphabetically, and so forth. The user can optionally select the order in which the process identifiers are displayed.

Graph 604 displays graphically the CPU usage of each process on the computing device at multiple times. Graph 604 is a live graph, updating the CPU usage of each process as the performance data for the data source changes. The CPU usage of a process at a particular time refers to what percentage of the CPU is used by the process at that particular time. The percentage of the CPU can be a percentage of the overall processing capacity of the CPU, or a percentage of the processing capacity of the CPU being used at the particular time. The CPU usage of a process at a particular time is determined based on the collected performance data, as discussed above.

The vertical axis identifies values of CPU usage (e.g., a percentage of the CPU). The scale along the vertical axis of graph 604 can change, varying based on the largest amount of CPU usage of a process. For example, if the largest amount of CPU usage of a process is 15 percent, then the scale along the vertical axis of graph 604 can range from 0 to 15 (or 0 to 20). Alternatively, the scale along the vertical axis of graph 604 can be fixed (e.g., ranging from 0 to 100).

The horizontal axis of graph 604 identifies a time range for the performance data. The time range for the performance data is illustrated as time range 606. Although time range 606 is illustrated at the bottom of analysis portion 304, time range 606 can alternatively be illustrated in other locations (e.g., adjacent to graph 604). Thus, in the illustrated example, the time range for the performance data displayed in graph 604 is from approximately 60 to 190. A text description identifying the start time for the time range, the end time for the time range, and the duration of the time range can also be displayed as illustrated in FIG. 6. Although illustrated as being to the left of time range 606 in FIG. 6, the text description can alternatively be displayed in other areas, such as below time range 606, to the right of time range 606, in a tooltip when a pointer or other object hovers over time range 606, and so forth.

Time range 606 can be the same as time range 318 or alternatively different. Given the smaller portion of display area that is typically used by thumbnail portion 302, time range 318 is typically shorter (a smaller time range) than time range 606. For example, time range 318 can be a subset of the time range 606, including a beginning portion of time range 606, an ending portion of time range 606, a middle portion of time range 606, and so forth.

It should be noted that the time range 606 can change, and the user can select any time range that he or she desires. The user can select a time range in various manners, such as entering particular numbers specifying the time range (e.g., 60 and 190), selecting a time range from another chart or timeline, selecting a time range from a menu, moving a scroll bar, and so forth. In response to selection of a particular time range, the performance data for the data source displayed in analysis portion 304 and the thumbnail graphs in graph portion 302 are updated to reflect the performance data in the selected time range.

Each process identified in legend 602 corresponds to a line in graph 604, and this correspondence can be displayed in analysis view portion 304. In the illustrated example, graph 604 shows lines with different patterns. Each identified process has a different line pattern (which, although not illustrated in FIG. 6, can be displayed in legend 602 adjacent to or otherwise associated with the corresponding process identifier), allowing the CPU usage of the different processes to be readily identified by the user. Alternatively, the correspondence between process identifiers and graph lines can be displayed in different manners, such as being color-coded (e.g., the process identifier in legend 602 being displayed with the same color as the corresponding line in graph 604), being weight-based (e.g., the process identifier in legend 602 being displayed with characters having the same thickness or weight as the corresponding line in graph 604), combinations thereof, and so forth.

In the illustrated example, four different lines are illustrated in graph 604, one for each process identifier displayed in legend 602. However, it should be noted that multiple additional lines can be displayed in graph 604, such as a line for each process on the computing device regardless of whether displayed in legend 602. For example, a computing device may have twenty processes running, although identifiers of only four are displayed in legend 602 at any given time (the others being displayed if the user scrolls through the process identifiers), and lines for all twenty processes can be displayed in graph 604.

It should also be noted that in certain circumstances a line in graph 604 may not be displayed for particular processes. For example, the computing device may have an "idle" process, which refers to the process that is deemed to be using the CPU when no other processes are using the CPU. An identifier of the "idle" process may be displayed in legend 602 (e.g., as Process A) but a line indicating CPU usage by the "idle" process is not displayed in graph 604.

A process can also have multiple sub-processes or threads, and the usage data for those multiple sub-process or threads is combined (e.g., added together) to obtain the usage data for the process that is displayed in graph 604. Identifiers of the sub-processes or threads of a process can also be displayed, such as in response to a user selection. A user selection to have identifiers of the sub-processes or threads displayed can be received in various manners, such as a user input selecting a menu item, user input selecting an icon or symbol, user input selecting a process identifier, and so forth.

In the illustrated example of FIG. 6, an expand box (illustrated as a box with a "+" sign) is associated with and displayed adjacent to each process identifier that includes one or more sub-processes or threads. In response to user selection of an expand box associated with a process identifier, identifiers of the sub-processes or threads of the process identifier are displayed in legend 602. For each sub-process or thread, a line can also optionally be displayed in graph 604 indicating the CPU usage by that sub-process or thread. The lines in graph 604 indicating CPU usage for the sub-processes or threads can be in addition to, or in place of, the line in graph 604 indicating CPU usage for the process. The expand box can also be replaced with a collapse box (e.g., illustrated as a box with a "−" sign). In response to user selection of a collapse box associated with a process identifier, the process identifier remains displayed in legend 602 but the identifiers of the sub-processes or threads of the process identifier are no longer displayed in legend 602 (and lines indicating CPU usage by the sub-processes or threads are also no longer displayed in graph 604).

Additionally, a user can optionally provide an input, via legend 602, to have lines indicating CPU usage by selected ones of the processes identified in legend 602 displayed in graph 604. A user selection to have lines of selected ones of the identified processes displayed can be received in various manners, such as a user input selecting a menu item, user input selecting an icon or symbol, user input selecting a process identifier, and so forth.

In the illustrated example of FIG. 6, a checkbox is associated with (displayed adjacent to) each process identifier. If identifiers of one or more sub-processes or threads of a process are displayed in legend 602, then a checkbox can be displayed adjacent to each sub-process or thread identifier. Multiple ones of the checkboxes can be selected and deselected at various times by the user, allowing the user to select which processes are to have lines displayed in graph 604 at any given time. In response to user selection of a particular checkbox, the line indicating CPU usage for the associated identified process is displayed in graph 604. In response to user de-selection of a particular checkbox, the line indicating CPU usage for the associated identified process is not displayed in graph 604.

In the illustrated example of FIG. 6, graph 604 and legend 602 are for the CPU usage—sample data source. It should be noted that similar legends and graphs can be included in analysis view portion 304 for different data sources and/or attributes.

In one or more embodiments, a user can also select a region of interest, which is a portion of a time range that is of interest to the user. The region of interest can be selected in a variety of different manners, such as entering particular numbers specifying the beginning and ending of the portion of the time range (e.g., 80 and 90), selecting the portion of the time range from another chart or timeline, selecting the portion of the time range from a menu, dragging his or finger or other object across a portion of the time range 318 or 606, using a mouse or other cursor control device to click on the beginning and ending of the portion along time range 318 or 606, and so forth.

In response to user selection of a portion of the time range, the selected portion is identified in the various time ranges and graphs displayed as part of the system performance analysis UI. The selected portion of the time range is synchronized across all (or at least a subset) of these time ranges and graphs, allowing the performance data represented in these graphs during the selected portion of the time range to be readily identified by the user. The selected portion of the time range is synchronized across the various graphs displayed in analysis view portion 304 and the graphs displayed in thumbnails of thumbnail portion 302. The selected portion of the time range being synchronized refers to the selected portion of the time range being identified and displayed in the various graphs displayed in analysis view portion 304 and the graphs displayed in thumbnails of thumbnail portion 304. The selected portion of the time range is synchronized across the time ranges and graphs regardless of the manner in which the portion of the time range is identified. For example, the user can identify the portion of the time range by selecting a portion of time range 318 in thumbnail portion 302, and have the selected portion of the time range identified and displayed in graphs in analysis view portion 304. By way of another example, the user can identify the portion of the time range by selecting a portion of time range 606 in analysis view portion 304, and have the selected portion of the time range identified and displayed in graphs in thumbnails of thumbnail portion 302.

Figure 7:
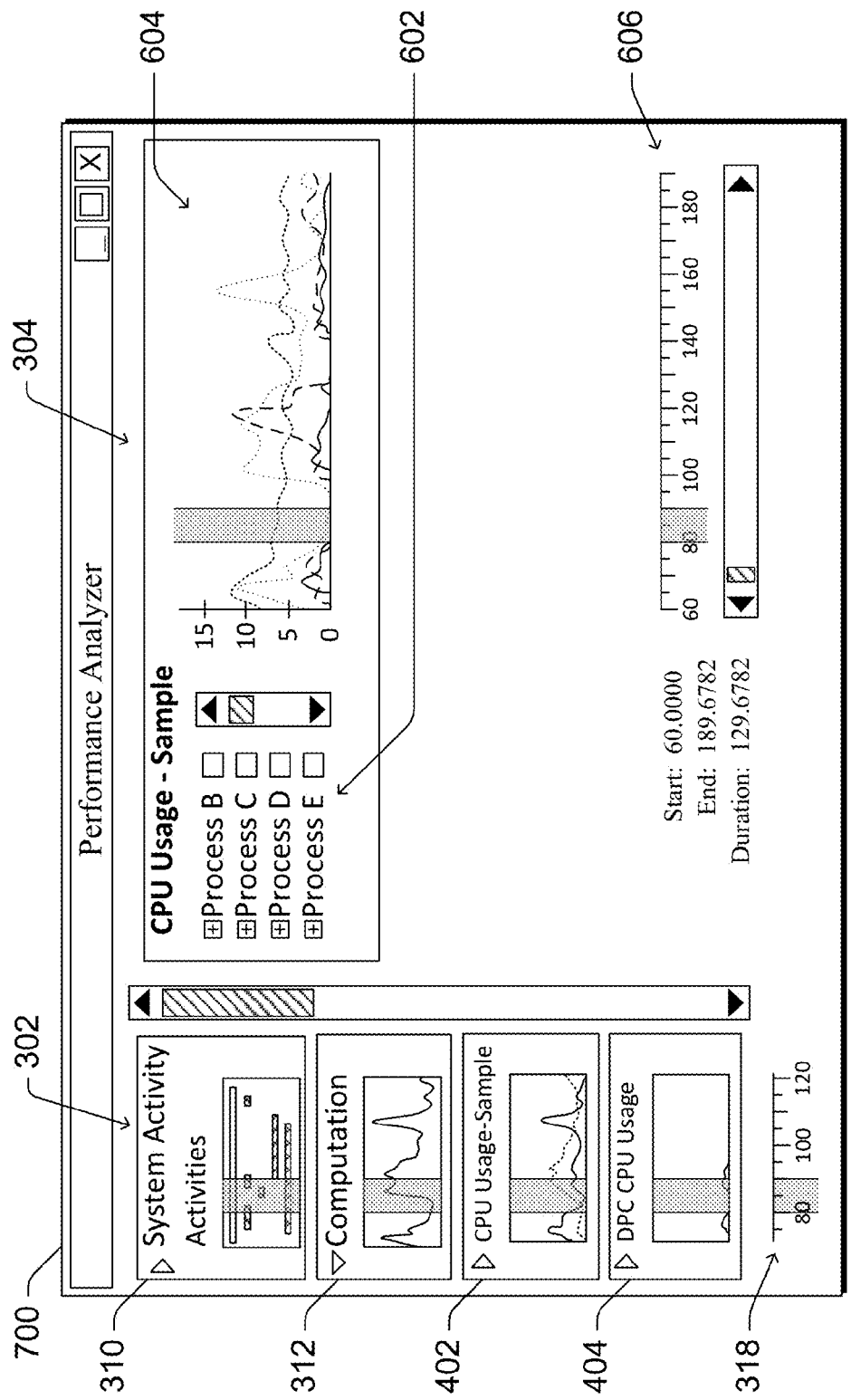

FIG. 7 illustrates an example display 700 implementing the hierarchical live graphs for performance data display in accordance with one or more embodiments. Display 700 illustrates a system performance analysis UI that includes a thumbnail portion 302 and an analysis view portion 304, analogous to the discussions above. Display 700 is similar to display 600 of FIG. 6, but illustrates the situation in which a portion of time has been selected by the user as a region of interest. In the example of FIG. 7, a portion of the time range from 80 to 90 has been selected by the user as a region of interest.

In response to user selection of a portion of the time range, the selected portion is identified in graph 604. The selected portion identified in graph 604 is the portion of graph 604 that displays performance data for the times included in the selected portion of the time range. In one or more embodiments, the selected portion is highlighted, illustrated as cross hatching in FIG. 7. Alternatively, the selected portion can be identified in different manners, such as with different intensities (e.g., parts of lines in the selected portion can be displayed with greater intensity or brightness than parts of lines not in the selected portion), arrows or other indicators can be displayed along the horizontal axis of graph 604, and so forth.

Additionally, the selected portion is also identified in each thumbnail 310, 312, 402, and 404 in thumbnail portion 302. The selected portion identified in each thumbnail is the portion of the graph displayed in each thumbnail that displays performance data for the times included in the selected portion of the time range. In one or more embodiments, the selected portion is highlighted in the thumbnails, illustrated as cross hatching in FIG. 7. Alternatively, the selected portion can be identified in different manners, such as with different intensities (e.g., parts of lines in the graphs displayed in the thumbnails in the selected portion can be displayed with greater intensity or brightness than parts of lines not in the selected portion), arrows or other indicators can be displayed along the horizontal axis of graphs displayed in the thumbnails, and so forth.

Additionally, in one or more embodiments in response to user selection of a portion of the time range, the selected portion is identified in time range 606 and time range 318. The selected portion can be identified in time ranges 606 and 318 in different manners, such as highlighting, analogous to identification of the selected portion in graph 604 as discussed above, using different intensities or colors, using arrows or other indicators displayed along the time range, and so forth.

In the example of FIG. 7, a single portion of the time range has been selected as the region of interest. Alternatively, multiple portions of the time range can be selected as regions of interest, and the multiple portions identified in graph 604 as well as the graphs in thumbnails of thumbnail portion 302. The multiple portions can be identified in the same manner (e.g., using the same shading) or different manners (e.g., different types or colors of shading, multiple different intensities, and so forth).

Figure 8:
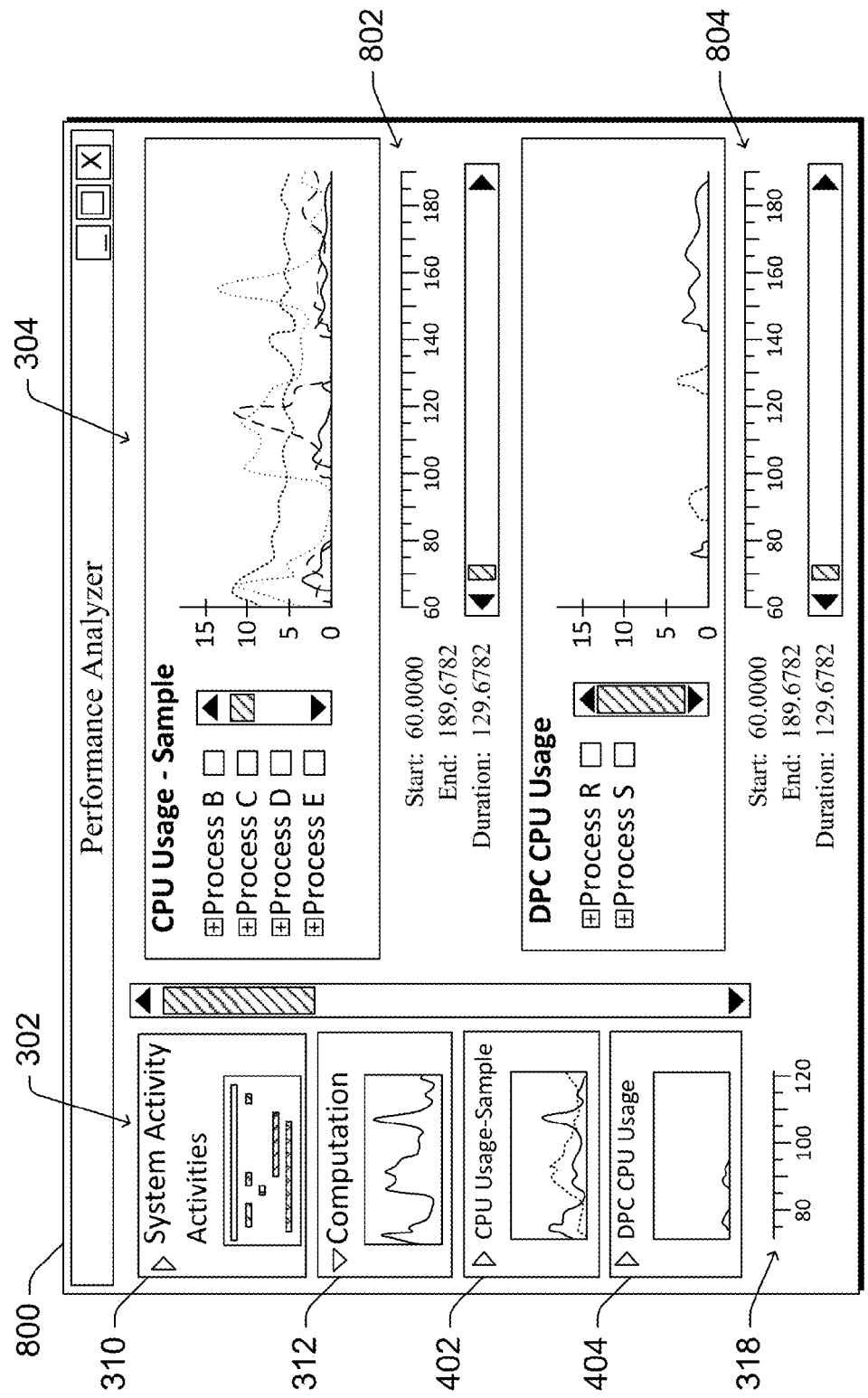

FIG. 8 illustrates an example display 800 implementing the hierarchical live graphs for performance data display in accordance with one or more embodiments. Display 800 illustrates a system performance analysis UI that includes a thumbnail portion 302 and an analysis view portion 304, analogous to the discussions above. Display 800 is similar to display 600 of FIG. 6, but illustrates the situation where the CPU usage-sample thumbnail 402 and the DPC CPU usage thumbnail 404 have been selected and various additional data associated with the CPU usage-sample thumbnail 402 and the DPC CPU usage thumbnail 404 are displayed in analysis view portion 304.

In the illustrated example, analysis view portion 304 includes a legend and graph for both the CPU usage-sample data source and the DPC CPU usage data source. These legends and graphs are analogous to the legends and graphs discussed above. Different time ranges 802 and 804 are associated with each graph, analogous to time range 606 discussed above. Alternatively, a single time range can be displayed and associated with both graphs in analysis view portion 304.

Figure 9:
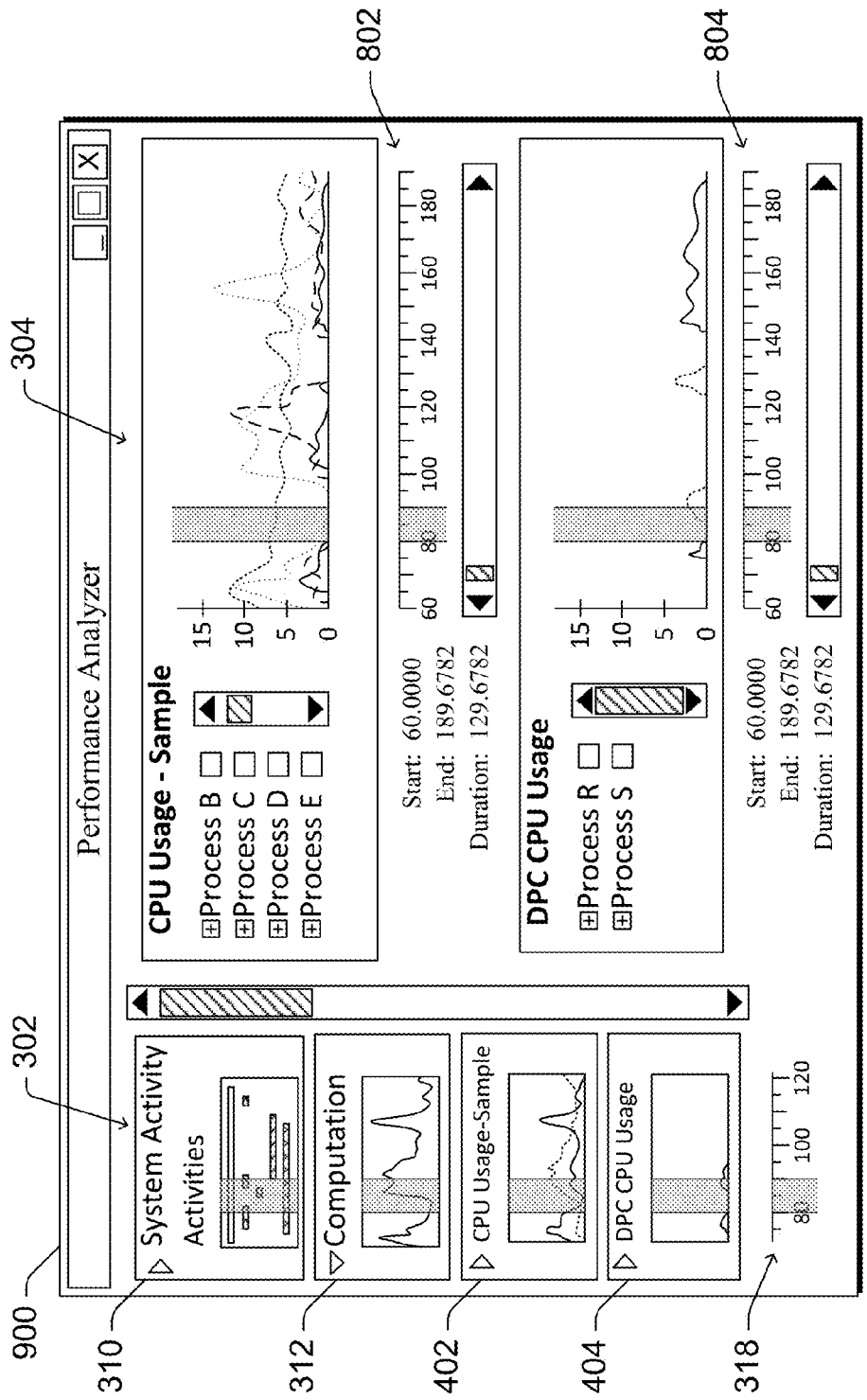

FIG. 9 illustrates an example display 900 implementing the hierarchical live graphs for performance data display in accordance with one or more embodiments. Display 900 illustrates a system performance analysis UI that includes a thumbnail portion 302 and an analysis view portion 304, analogous to the discussions above. Display 900 is similar to display 800 of FIG. 8, but illustrates the situation in which a portion of time has been selected by the user as a region of interest. In the example of FIG. 9, a portion of the time range from 80 to 90 has been selected by the user as a region of interest.

In response to user selection of a portion of the time range, the selected portion is identified in each graph in analysis view portion 304. The selected portion identified in each graph in analysis view portion 304 is the portion of the graph that displays performance data for the times included in the selected portion of the time range. In one or more embodiments, the selected portion is highlighted, illustrated as cross hatching in FIG. 9, although the selected portion can alternatively be identified in other manners as discussed above.

Additionally, the selected portion is also identified in each thumbnail 310, 312, 402, and 404 in thumbnail portion 302. The selected portion identified in each thumbnail is the portion of the graph displayed in each thumbnail that displays performance data for the times included in the selected portion of the time range. In one or more embodiments, the selected portion is highlighted in the thumbnails, illustrated as cross hatching in FIG. 9, although the selected portion can alternatively be identified in other manners as discussed above.

Additionally, in one or more embodiments in response to user selection of a portion of the time range, the selected portion is identified in time ranges 318, 802, and 804. The selected portion can be identified in time ranges 318, 802, and 804 in different manners, such as highlighting or other manners as discussed above.

In the example of FIG. 9, a single portion of the time range has been selected as the region of interest. Alternatively, multiple portions of the time range can be selected as regions of interest, and the multiple portions identified in the graphs displayed in analysis view portion 304 as well as the graphs in thumbnails of thumbnail portion 302. The multiple portions can be identified in the same manner (e.g., using the same shading) or different manners (e.g., different types or colors of shading, multiple different intensities, and so forth).

Figure 10:
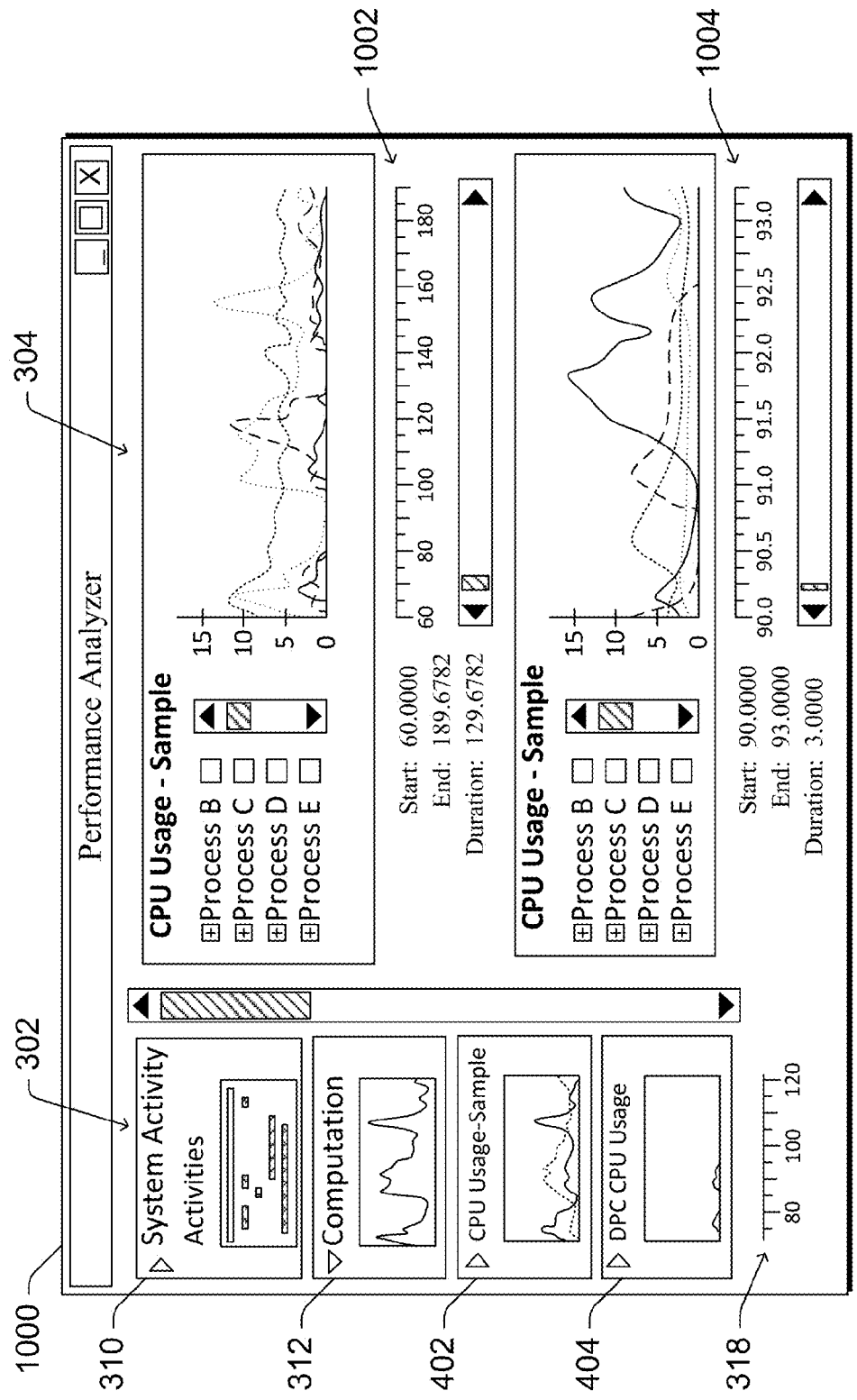

FIG. 10 illustrates an example display 1000 implementing the hierarchical live graphs for performance data display in accordance with one or more embodiments. Display 1000 illustrates a system performance analysis UI that includes a thumbnail portion 302 and an analysis view portion 304, analogous to the discussions above. Display 1000 is similar to display 800 of FIG. 8, but illustrates the situation where the CPU usage-sample thumbnail 402 is selected (e.g., multiple times) and various additional data associated with the CPU usage-sample thumbnail 402 for two different time ranges are displayed in analysis view portion 304.

In the illustrated example, analysis view portion 304 includes multiple legends and graphs for the CPU usage-sample data source. These legends and graphs are analogous to the legends and graphs discussed above. Different time ranges 1002 and 1004 are associated with each graph, each analogous to time range 606 discussed above. As illustrated, time ranges 1002 and 1004 are different time ranges, time range 1002 being from approximately 60 to 190, and time range 1004 being from approximately 90 to 93.

Analysis view portion 304 can include any number of legends and graphs for different data sources and/or the same data source. The user can select different time ranges for these different legends and graphs in various manners as discussed above.

Figure 11:
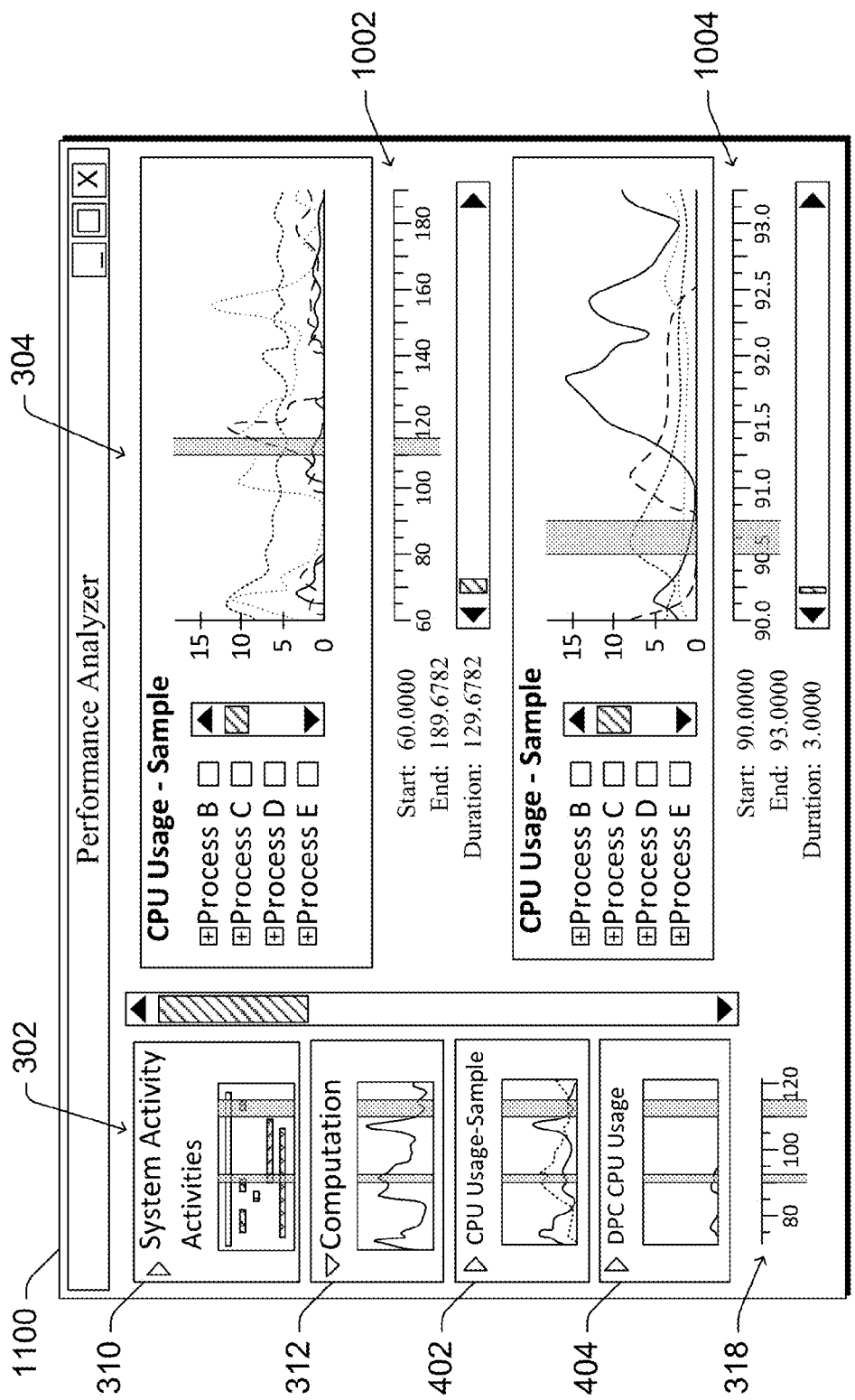

FIG. 11 illustrates an example display 1100 implementing the hierarchical live graphs for performance data display in accordance with one or more embodiments. Display 1100 illustrates a system performance analysis UI that includes a thumbnail portion 302 and an analysis view portion 304, analogous to the discussions above. Display 1100 is similar to display 1000 of FIG. 10, but illustrates the situation in which multiple portions of time have been selected by the user as regions of interest. In the example of FIG. 11, a portion of the time range from 110 to 115 and a portion of the time range from 90.5 to 90.75 have been selected by the user as regions of interest.

In response to user selection of multiple portions of the time range, the selected portions are identified in one or more graphs in analysis view portion 304. Each selected portion can be identified in each graph in analysis view portion 304, or each selected portion can be associated with and identified in less than each graph (e.g., in individual graphs) in analysis view portion 304. The selected portion identified in each graph in analysis view portion 304 is the portion of the graph that displays performance data for the times included in one of the selected portions of the time range. In one or more embodiments, the selected portions are highlighted, illustrated as cross hatching in FIG. 11, although the selected portions can alternatively be identified in other manners as discussed above.

Additionally, the selected portions are also identified in each thumbnail 310, 312, 402, and 404 in thumbnail portion 302. The selected portions identified in each thumbnail are the portion of the graph displayed in each thumbnail that displays performance data for the times included in the selected portions of the time range. In one or more embodiments, the selected portions are highlighted in the thumbnails, illustrated as cross hatching in FIG. 11, although the selected portions can alternatively be identified in other manners as discussed above.

Additionally, in one or more embodiments in response to user selection of a portion of the time range, the selected portions are identified in time ranges 318, 1002, and 1004. The selected portions can be identified in time ranges 318, 1002, and 1004 in different manners, such as highlighting or other manners as discussed above.

Example graphs are displayed in analysis view portion 304 of the user interface in various figures herein. Different views for each graph can be available for selection by a user. These different views can include different types of graphs, different types of charts or tables, other data presentation formats, and so forth. The user can select which of multiple views he or she desires for each data source in any of a variety of different manners using any of a variety of different types of input as discussed above. Various different mechanisms can be used to allow a user to select a view for a data source, such as voice input, selection of a view identifier from a context menu or pull-down menu, text input, dragging and dropping an icon or other representation of a view onto a particular portion of the UI, and so forth.

Similarly, example graphs displayed in thumbnails of the thumbnail portion 302 of the user interface are illustrated in various figures herein. Different views for each thumbnail graph can be available for selection by a user. These different thumbnail graph views can include different types of graphs, different types of charts or tables, other data presentation formats, and so forth. The user can select which of multiple thumbnail graph views he or she desires for each thumbnail graph in any of a variety of different manners using any of a variety of different types of input as discussed above. Various different mechanisms can be used to allow a user to select a thumbnail graph view, such as voice input, selection of a thumbnail graph view identifier from a context menu or pull-down menu, text input, dragging and dropping an icon or other representation of a thumbnail graph view onto a particular portion of the UI, and so forth.

Returning to FIG. 2, preset level 206 includes multiple different presets for each data source. Each data source can have one or more attributes, and a preset refers to an attribute for a data source as discussed above. A user input selecting one or more data source thumbnails in a thumbnail portion (e.g., thumbnail portion 302 discussed above) can be received in various manners, analogous to a user input selecting one or more performance indicator thumbnails as discussed above. For example, the user can touch or tap a geometric shape such as a triangle adjacent to the text description of a data source thumbnail in the thumbnail portion, touch or tap a graph displayed in the thumbnail, and so forth.

Figure 12:
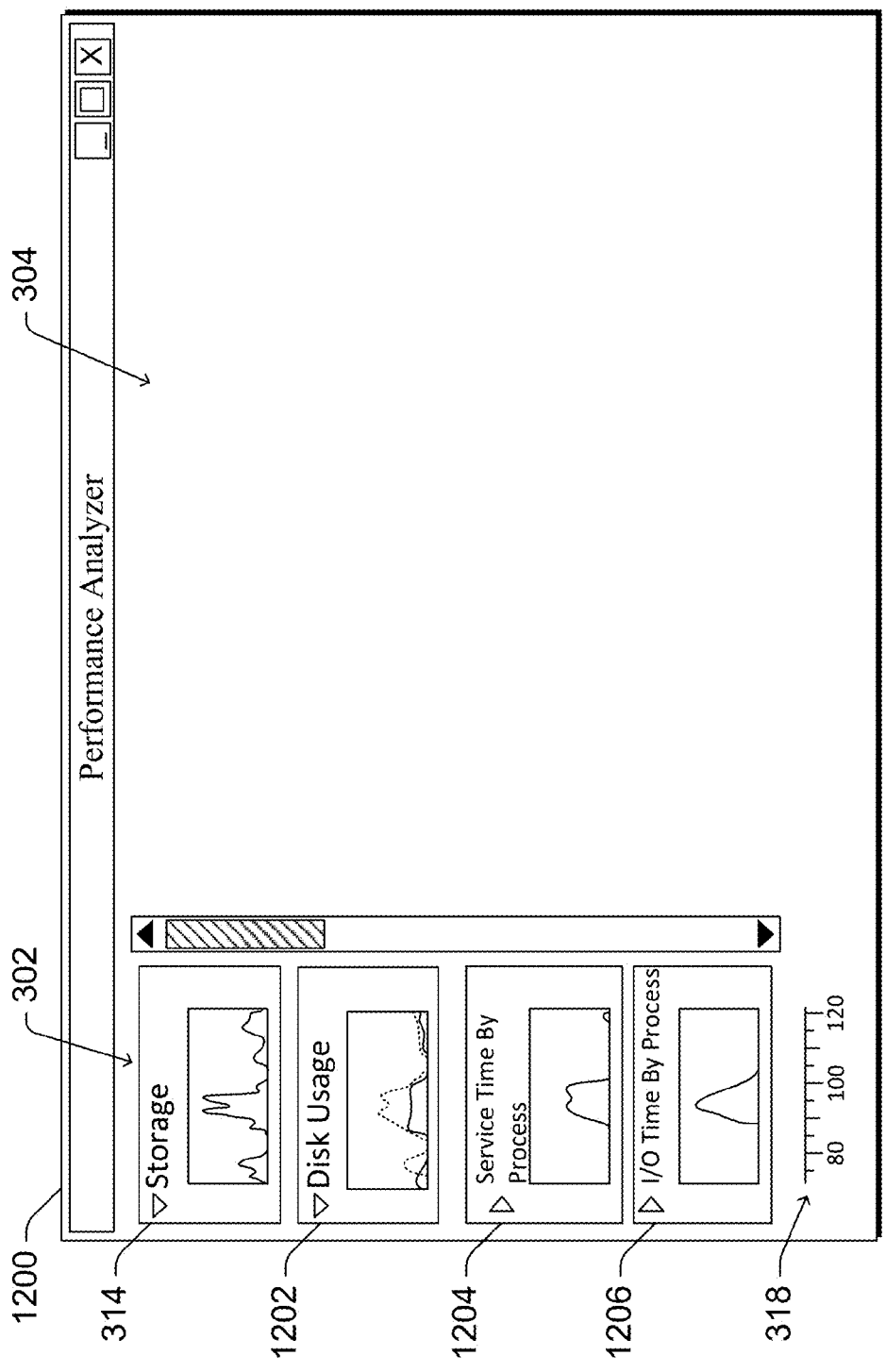

In response to user selection of a data source thumbnail in the thumbnail portion, one or more preset graphs associated with the selected data source thumbnail are displayed in preset thumbnails in the thumbnail portion. FIG. 12 illustrates an example display 1200 implementing the hierarchical live graphs for performance data display in accordance with one or more embodiments. Display 1200 illustrates a system performance analysis UI that includes a thumbnail portion 302 and an analysis view portion 304, analogous to the discussions above. In the example of FIG. 12, the storage thumbnail 314 (a performance indicator thumbnail) and the disk usage thumbnail 1202 (a data source thumbnail) have been selected, and multiple thumbnails for presets associated with the disk usage data source (service time by process and I/O time by process as illustrated) are displayed. In the illustrated example, thumbnail portion 302 includes a storage thumbnail 314, a disk usage thumbnail 1202, a service time by process thumbnail 1204, and an I/O time by process thumbnail 1206 are illustrated, although thumbnails for various different performance indicators, data sources, and/or presets can be included in thumbnail portion 302. Additionally, in situations in which more thumbnails are available than can be displayed at one time, the user can optionally scroll through the various thumbnails using various input mechanisms (e.g., using a scroll bar, using a gesture to scroll through a list, and so forth).

It should be noted that in thumbnail portion 302 the preset thumbnails (and/or graphs displayed in the preset thumbnails) can be displayed in the same manner as the performance indicator thumbnails (and/or graphs displayed in the performance indicator thumbnails) and/or data source thumbnails (and/or graphs displayed in the data source thumbnails), or in a different manner. For example, the data source thumbnails (and/or graphs displayed in the performance indicator thumbnails) can be displayed as taller than, as wider than, with different fonts than, and so forth the preset thumbnails (and/or graphs displayed in the data source thumbnails).

In one or more embodiments, the presets for which preset thumbnails are displayed in thumbnail portion 302 are user selectable. Various different mechanisms can be used to allow a user to select a preset, such as voice input, selection of a preset source from a context menu or pull-down menu, text input, dragging and dropping an icon or other representation of a preset onto a particular portion of the UI, and so forth. A user can provide various inputs as discussed above to identify one or more presets for which thumbnails are displayed in portion 302.

Thus, thumbnail portion 302 displays thumbnails associated with presets as well as (or alternatively in place of) thumbnails associated with data sources and/or thumbnails associated with performance indicators. A user input selecting one or more thumbnails associated with a performance indicator can be received, and in response to the user input thumbnails for the data sources associated with that performance indicator are displayed. Similarly, a user input selecting one or more thumbnails associated with a data source can be received, and in response to the user input thumbnails for the presets associated with that data source are displayed. Furthermore, display of the thumbnails for presets associated with the data source can cease in response to a subsequent user input selecting the thumbnail associated with the data source, and display of the thumbnails for data sources associated with the performance indicator can cease in response to a subsequent user input selecting the thumbnail associated with the performance indicator. This subsequent user selection of the thumbnail can be received via any of a variety of different user inputs as discussed above. Thus, the user can readily switch between having thumbnails for data sources and/or presets displayed and having thumbnails for data sources and/or presets not displayed.

Each thumbnail associated with a preset refers to a tile, button, or other object displayed in a user interface as discussed above. The thumbnail typically includes, but need not include, a text description of the associated preset (e.g., service time by process, I/O time by process, etc.). A thumbnail also includes a graph of performance data of the associated preset.

The graph of performance data included in each preset thumbnail in portion 302 is an indication of the performance data for the preset, and this performance data displayed in a preset thumbnail graph can be determined in different manners. In one or more embodiments, the performance data displayed in a preset thumbnail graph is the performance data for the attribute to which the preset refers (e.g., service time by process, I/O time by process, and so forth). Alternatively, the performance data displayed in a preset thumbnail graph can be the average, sum, or other result of combining the performance data for one or more aspects of the attribute.

Each preset thumbnail graph displays performance data for the attribute to which the preset refers. As the performance data for the attribute changes, the preset thumbnail graph changes to reflect the changes to the performance data. Thus, the preset thumbnail graph is also referred to as a live graph—rather than being simply an indication of a type of data source or performance data, the preset thumbnail graph displays a graph of the performance data as the performance data changes.

The time range for the performance data displayed in the data source thumbnail graphs and performance indicator thumbnail graphs is illustrated as time range 318. Although time range 318 is illustrated at the bottom of portion 302, time range 318 can alternatively be displayed in other locations as discussed above.

In one or more embodiments, the preset thumbnails are color coded so that thumbnails associated with presets that are associated with different data sources have different colors. For example, each data source (e.g., disk usage, file input/output usage, registry usage, etc.) can be associated with a different color, and each data source thumbnail as well as each preset thumbnail for a preset associated with the data source can be displayed with the color (or different shades of the color) associated with that data source. Alternatively, other techniques can be used to distinguish the preset thumbnails associated with different data sources from one another. For example, different sized preset thumbnails can be used, different fonts for text descriptions of preset thumbnails can be used, preset thumbnails having different geometric shapes (e.g., rectangle, circle, triangle, etc.) can be used, and so forth. Alternatively, the preset thumbnails can be color coded so that preset thumbnails associated with different presets have different colors (or are otherwise displayed in different manners to distinguish thumbnails corresponding to different data sources from one another)

A user input selecting one or more data preset thumbnails can be received. Selection of a preset thumbnail can be received via any of a variety of different user inputs as discussed above. For example, the user can touch or tap a preset thumbnail in portion 302, the user can provide a voice input identifying a preset thumbnail in portion 302, the user can touch or tap a geometric shape such as a triangle adjacent to the text description of a preset thumbnail in thumbnail portion 302, and so forth. In response to user selection of a preset thumbnail in thumbnail portion 302, one or more graphs associated with the selected preset thumbnail are displayed in analysis view portion 304.

Analysis view portion 304 displays additional data associated with a preset thumbnail in portion 302 (e.g., a user-selected preset thumbnail). This additional data includes an identification of the contributors to usage of a particular preset and/or an identification of how those contributors contribute to usage of a particular preset. These contributors can vary based on the type of preset, and can be for example processes, threads, input/output operations, and so forth. Each contributor can be an attribute (e.g., a process executing on a processor, types of operations performed on a disk, and so forth).

It should be noted that multiple different types of user inputs allowing selection of a preset data source thumbnail can be supported, with some user inputs (e.g., touching or tapping of a geometric shape adjacent to the text description of the data source thumbnail) indicating to display preset thumbnails in thumbnail portion 302, and other user inputs (e.g., touching or tapping of a graph in the data source thumbnail) indicating to display performance data in analysis view portion 304.

Various additional aspects of the system performance analysis UI are discussed above with reference to different figures. These additional aspects include the display of performance data being synchronized, selected portions of time ranges being synchronized across the time ranges and graphs, displaying of graphs for different data sources in analysis view portion 304, and so forth. It should be noted that these additional aspects apply analogously to preset thumbnails and additional data associated with presets displayed in analysis view portion 304. For example, one or more selected portions of a time range can be synchronized across the graphs displayed in preset thumbnails analogous to the graphs displayed in data source thumbnails as discussed above. By way of another example, additional data for presets can be displayed in analysis view portion 304 analogous to additional data for data sources as discussed above.

In the discussions above, various additional data associated with a selected data source thumbnail is discussed as being displayed in analysis view portion 304. Additionally or alternatively, the various additional data associated with a particular data source thumbnail can be displayed in other manners. In one or more embodiments, an additional window is displayed (oftentimes referred to as a tooltip) in which the data additional data associated with a data source thumbnail is displayed. This additional window is displayed, for example, in response to a pointer or other object hovering over (e.g., remaining positioned over) a data source thumbnail for at least a threshold amount of time.

Figure 13:
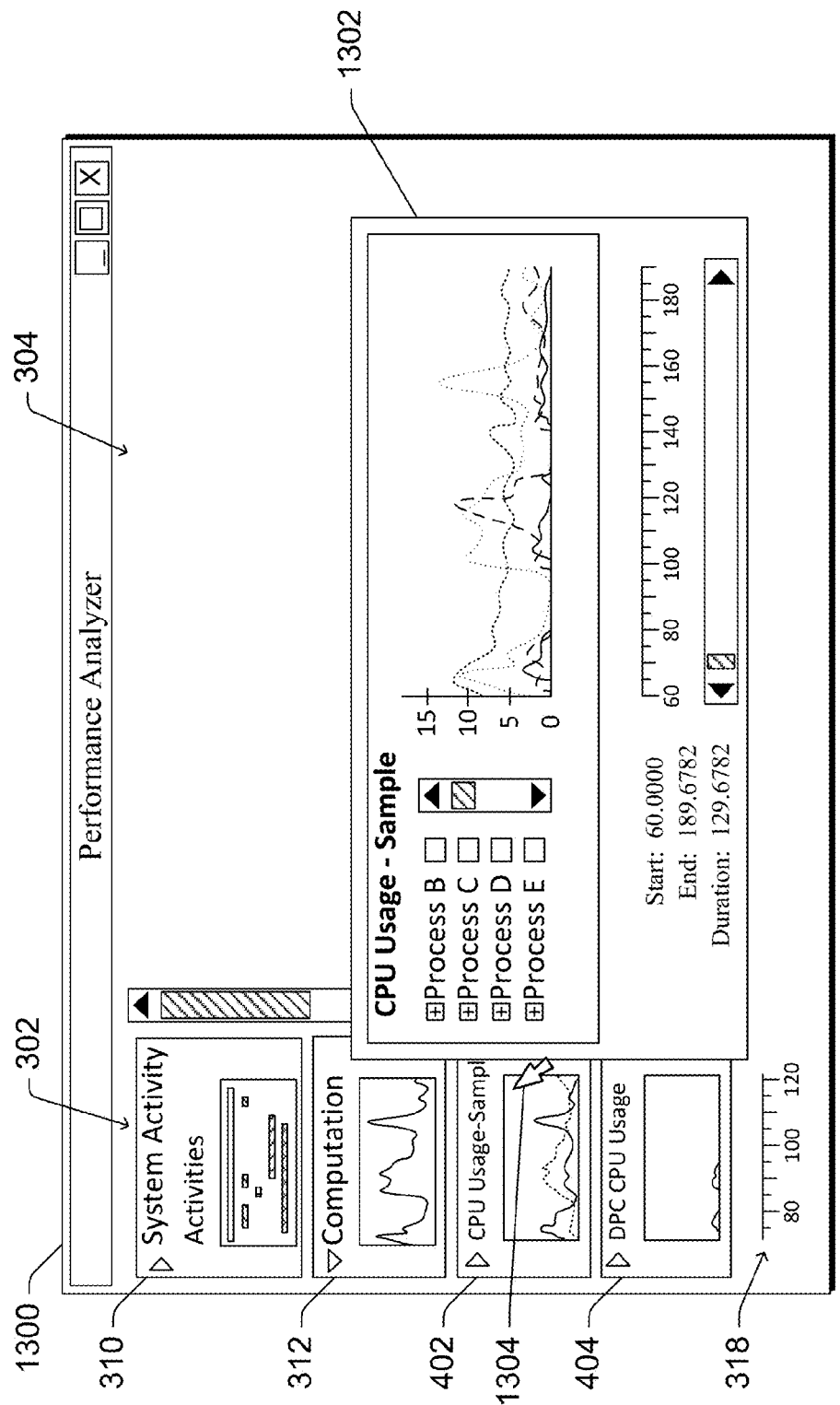

FIG. 13 illustrates an example display 1300 implementing the hierarchical live graphs for performance data display in accordance with one or more embodiments. Display 1300 illustrates a system performance analysis UI that includes a thumbnail portion 302, analogous to the discussions above. Display 1300 can also optionally include an analysis view portion 304, analogous to the discussions above. Display 1300 is similar to display 600 of FIG. 6, but the additional data associated with the CPU usage-sample thumbnail 402 is displayed in an additional window 1302 rather than in an analysis view portion 304. Thus, the user can readily see the various additional data associated with a particular data source thumbnail by simply hovering a pointer 1304 over a particular data source thumbnail. Although additional data associated with a particular data source thumbnail is illustrated in FIG. 13, additional data associated with other thumbnails (e.g., preset thumbnails) can alternatively be displayed in additional window 1302.

When the finger or other object is no longer hovering over the data source thumbnail, display of the additional window 1302 ceases. The additional data associated with the data source thumbnail can optionally be displayed in analysis view portion 304 at different times, such as concurrently with display of the additional window 1302, in response to user selection of the data source thumbnail in thumbnail portion 302, in response to user selection (e.g., an additional touch or other user input) of the additional window 1302, and so forth.

Similarly, various data source thumbnails associated with a performance indicator are discussed as being displayed in thumbnail portion 302. Additionally or alternatively, the various data source graphs associated with a particular performance indicator can be displayed in other manners. In one or more embodiments, an additional window is displayed (oftentimes referred to as a tooltip) in which the one or more data source graphs associated with a performance indicator are displayed. This additional window is displayed, for example, in response to a pointer or other object hovering over (e.g., remaining positioned over) a performance indicator thumbnail for at least a threshold amount of time.

Figure 14:
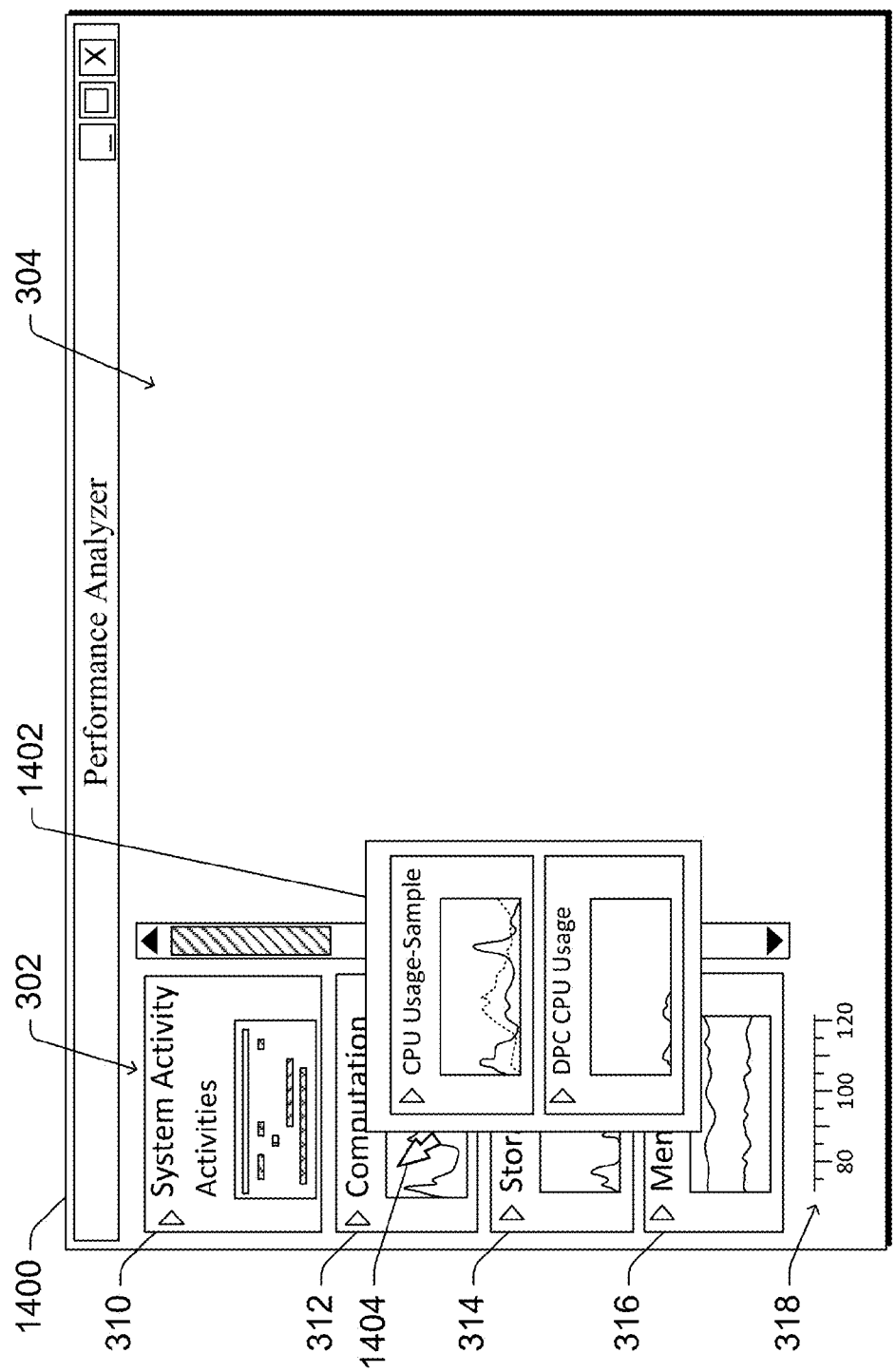

FIG. 14 illustrates an example display 1400 implementing the hierarchical live graphs for performance data display in accordance with one or more embodiments. Display 1400 illustrates a system performance analysis UI that includes a thumbnail portion 302, analogous to the discussions above. Display 1400 can also optionally include an analysis view portion 304, analogous to the discussions above. Display 1400 is similar to display 400 of FIG. 4, but the data source graphs associated with the performance indicator thumbnail 312 are displayed in an additional window 1402 rather than in thumbnail portion 302. Thus, the user can readily see the various data source graphs associated with a particular performance indicator thumbnail by simply hovering a pointer 1404 over a particular performance indicator thumbnail. Although data source graphs associated with a particular performance indicator thumbnail are illustrated in FIG. 13, other graphs (e.g., preset graphs associated with a particular data source graph) can alternatively be displayed in additional window 1402.

When the finger or other object is no longer hovering over the data source thumbnail, display of the additional window 1402 ceases. The data source thumbnails associated with the performance indicator thumbnail can optionally be displayed in thumbnail portion 302 at different times, such as concurrently with display of the additional window 1402, in response to user selection of the performance indicator thumbnail in thumbnail portion 302, in response to user selection (e.g., an additional touch or other user input) of the additional window 1402, and so forth.

Figure 15:
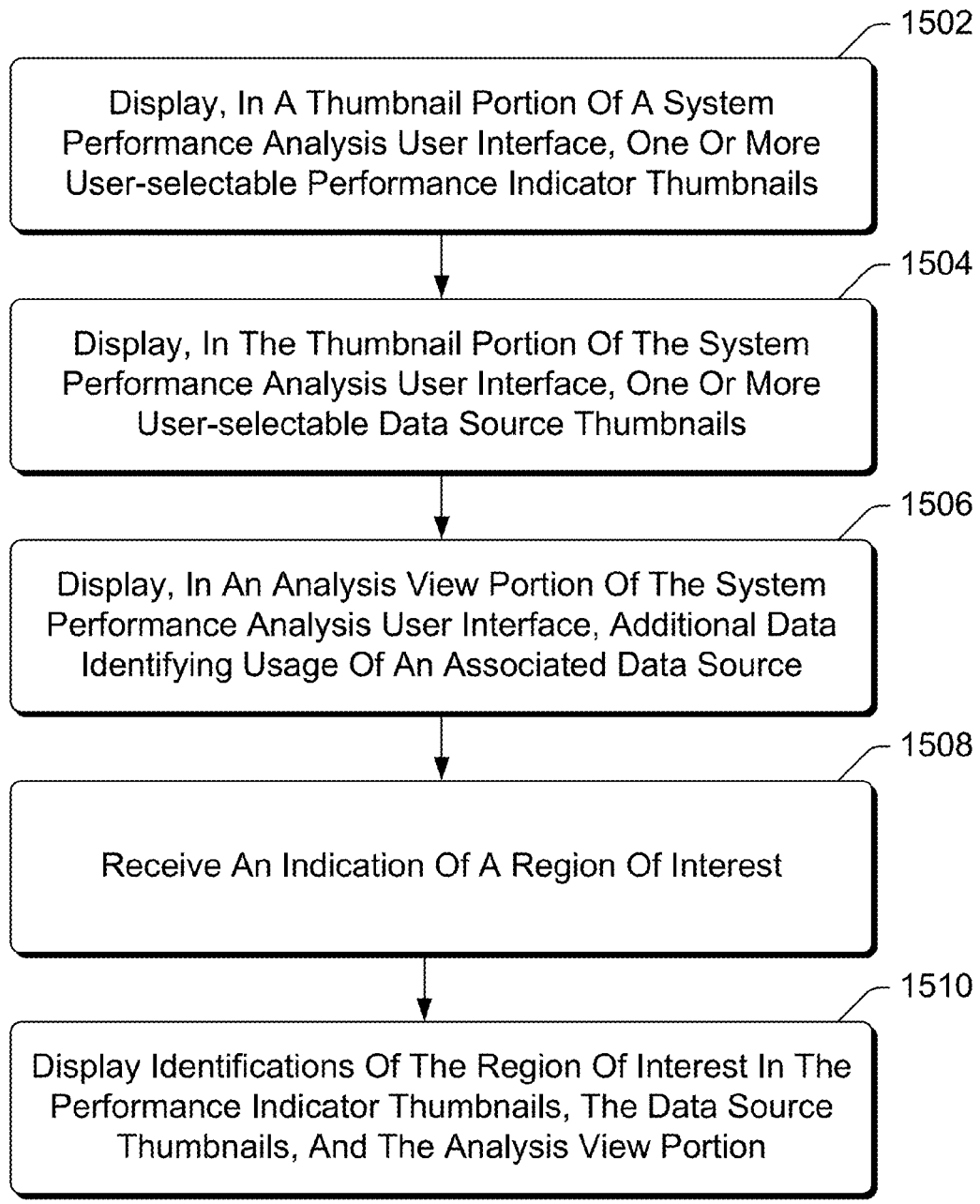
FIG. 15 is a flowchart illustrating an example process for implementing the hierarchical live graphs for performance data display in accordance with one or more embodiments.

FIG. 15 is a flowchart illustrating an example process 1500 for implementing the hierarchical live graphs for performance data display in accordance with one or more embodiments. Process 1500 is carried out by a system, such as system 100 of FIG. 1, and can be implemented in software, firmware, hardware, or combinations thereof. Process 1500 is shown as a set of acts and is not limited to the order shown for performing the operations of the various acts. Process 1500 is an example process for implementing hierarchical live graphs for performance data display; additional discussions of implementing hierarchical live graphs for performance data display are included herein with reference to different figures.

In process 1500, one or more user-selectable performance indicator thumbnails are displayed in a thumbnail portion of a system performance analysis user interface (act 1502). Each performance indicator thumbnail displays a live graph identifying performance data of an associated one of multiple performance indicators as discussed above.

One or more user-selectable data source thumbnails are also displayed in the thumbnail portion of the system performance analysis user interface (act 1504). Each data source thumbnail displays a live graph of performance of an associated data source as discussed above.

Additional data identifying usage of an associated data source is displayed in an analysis view portion of the system performance analysis user interface (act 1506). This additional data can include, for example, a graph displaying usage of the data source by each of multiple contributors as discussed above.

An indication of a region of interest can optionally be received (act 1508). The region of interest is a portion of time of interest to a user of the system, and the indication can be received via a variety of different user inputs as discussed above.

An identification of the region of interest is displayed (act 1510). This identification is displayed in each of the performance indicator thumbnails, in each of the data source thumbnails, and in one or more graphs of the analysis view portion as discussed above.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

The techniques discussed herein support various usage scenarios. A user of a device can readily analyze the performance of a system to identify a particular problem or issue he or she is experiencing. Rather than selecting from various static icons, the user can view performance indicator thumbnails displaying live graphs indicating the performance of data sources for various performance indicators of the system. The user can readily see at a glance whether there is an issue or problem with the data sources associated with each performance indicator. In response to selection of a particular performance indicator thumbnail, the user can view data source thumbnails displaying live graphs indicating the performance of those data sources, and select from those data source thumbnails to display additional data regarding those data sources and/or preset thumbnails displaying live graphs indicating the performance of various attributes of those data sources. Thus, rather than requiring the user to have detailed knowledge and experience regarding which performance indicators and/or data sources may be causing a particular problem, the user can readily go through the live graphs in the thumbnails in a top-down approach to more quickly identify the performance indicator and/or data source that may be causing the particular problem.

Figure 16:
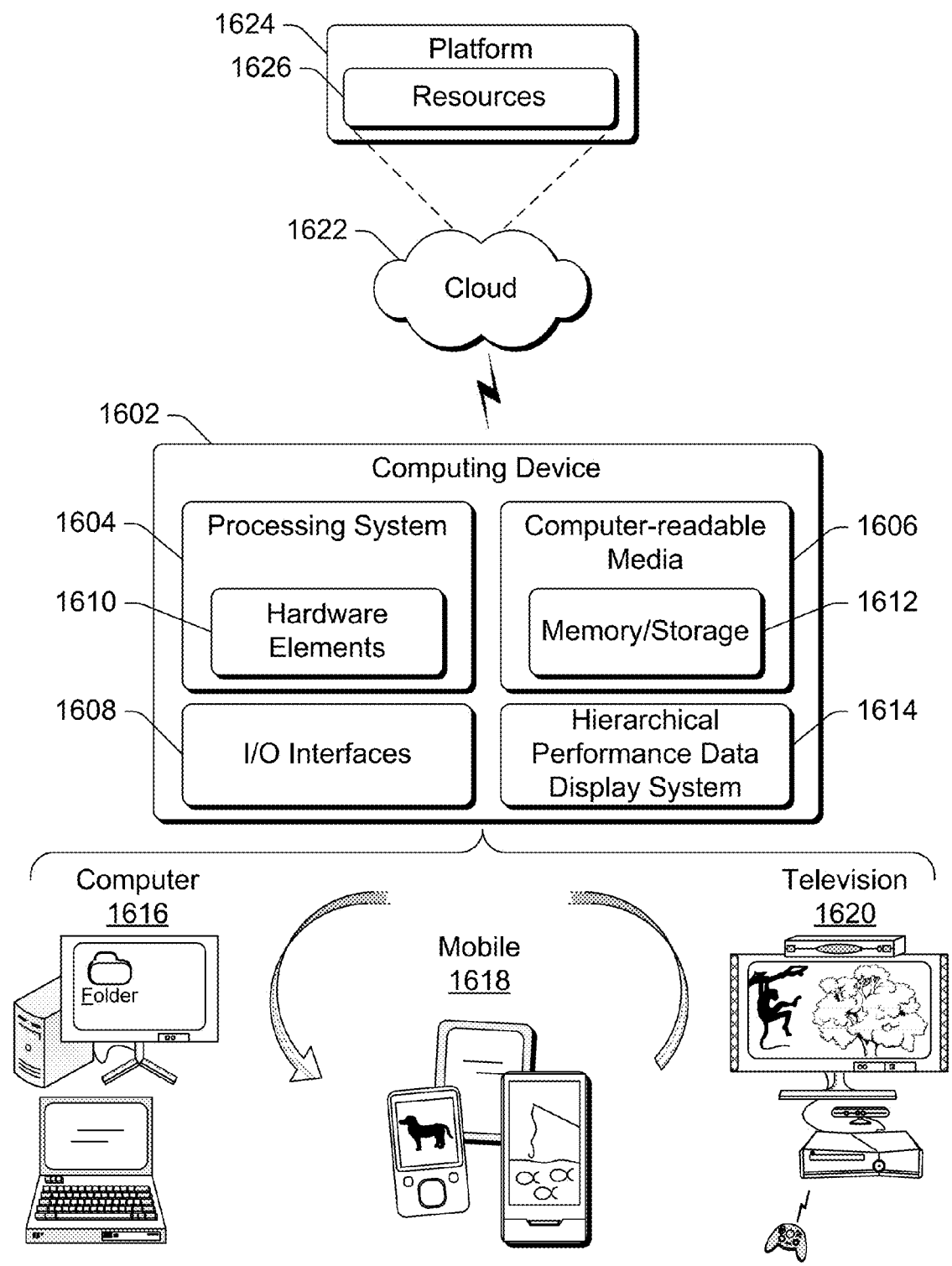
FIG. 16 illustrates an example system that includes an example computing device that is representative of one or more systems and/or devices that may implement the various techniques described herein.

FIG. 16 illustrates an example system generally at 1600 that includes an example computing device 1602 that is representative of one or more systems and/or devices that may implement the various techniques described herein. The computing device 1602 may be, for example, a server of a service provider, a device associated with a client (e.g., a client device), an on-chip system, and/or any other suitable computing device or computing system.

The example computing device 1602 as illustrated includes a processing system 1604, one or more computer-readable media 1606, and one or more I/O Interfaces 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware elements 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1606 is illustrated as including memory/storage 1612. The memory/storage 1612 represents memory/storage capacity associated with one or more computer-readable media. The memory/storage 1612 may include volatile media (such as random access memory (RAM)) and/or nonvolatile media (such as read only memory (ROM), Flash memory, optical disks, magnetic disks, and so forth). The memory/storage 1612 may include fixed media (e.g., RAM, ROM, a fixed hard drive, and so on) as well as removable media (e.g., Flash memory, a removable hard drive, an optical disc, and so forth). The computer-readable media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Computing device 1602 also includes a hierarchical performance data display system 1614. Hierarchical performance data display system 1614 displays a system performance analysis user interface including live graphs, as discussed above. Hierarchical performance data display system 1614 can implement, for example, hierarchical performance data display system 108 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" refers to media and/or devices that enable persistent storage of information and/or storage that is not transitory, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable media 1606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of modules as a module that is executable by the computing device 1602 as software may be achieved at least partially in hardware, e.g., through use of computer-readable storage media and/or hardware elements 1610 of the processing system. The instructions and/or functions may be executable/operable by one or more articles of manufacture (for example, one or more computing devices 1602 and/or processing systems 1604) to implement techniques, modules, and examples described herein.

As further illustrated in FIG. 16, the example system 1600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1602 may assume a variety of different configurations, such as for computer 1616, mobile 1618, and television 1620 uses. Each of these configurations includes devices that may have generally different constructs and capabilities, and thus the computing device 1602 may be configured according to one or more of the different device classes. For instance, the computing device 1602 may be implemented as the computer 1616 class of a device that includes a personal computer, desktop computer, a multi-screen computer, laptop computer, netbook, and so on.

The computing device 1602 may also be implemented as the mobile 1618 class of device that includes mobile devices, such as a mobile phone, portable music player, portable gaming device, a tablet computer, a multi-screen computer, and so on. The computing device 1602 may also be implemented as the television 1620 class of device that includes devices having or connected to generally larger screens in casual viewing environments. These devices include televisions, set-top boxes, gaming consoles, and so on.

The techniques described herein may be supported by these various configurations of the computing device 1602 and are not limited to the specific examples of the techniques described herein. This functionality may also be implemented all or in part through use of a distributed system, such as over a "cloud" 1622 via a platform 1624 as described below.

The cloud 1622 includes and/or is representative of a platform 1624 for resources 1626. The platform 1624 abstracts underlying functionality of hardware (e.g., servers) and software resources of the cloud 1622. The resources 1626 may include applications and/or data that can be utilized while computer processing is executed on servers that are remote from the computing device 1602. Resources 1626 can also include services provided over the Internet and/or through a subscriber network, such as a cellular or Wi-Fi network.

The platform 1624 may abstract resources and functions to connect the computing device 1602 with other computing devices. The platform 1624 may also serve to abstract scaling of resources to provide a corresponding level of scale to encountered demand for the resources 1626 that are implemented via the platform 1624. Accordingly, in an interconnected device embodiment, implementation of functionality described herein may be distributed throughout the system 1600. For example, the functionality may be implemented in part on the computing device 1602 as well as via the platform 1624 that abstracts the functionality of the cloud 1622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    displaying, in a first portion of a computing device performance analysis user interface, multiple user-selectable performance indicator thumbnails, each performance indicator thumbnail being associated with one of multiple performance indicators of the computing device and displaying a live graph identifying performance data for the associated one of the multiple performance indicators;
    displaying, in the first portion of the computing device performance analysis user interface and in response to user selection of a performance indicator thumbnail associated with a performance indicator, one or more data source thumbnails associated with the performance indicator, each of the one or more data source thumbnails displaying a live graph of performance data of an associated data source and being user-selectable to cause information to be displayed in a second portion of the computing device performance analysis user interface;
    displaying, in the second portion of the computing device performance analysis user interface and in response to user selection of a data source thumbnail, additional data identifying one or more contributors to usage of a particular data source, the particular data source being the data source associated with the selected data source thumbnail;
    receiving a user indication, input via the first portion of the computing device performance analysis user interface, of a portion of time; and
    displaying an identification by simultaneously highlighting the portion of time in each live graph of performance data of the associated data source and each one of the multiple performance indicator thumbnails in the first portion of the computing device performance analysis user interface and each of the additional data identifying one or more contributors to usage of a particular data source in the second portion of the computing device performance analysis user interface.

2. A method as recited in claim 1, further comprising displaying in the first portion the one or more data source thumbnails concurrently with the one or more performance indicator thumbnails such that a user can visually ascertain which data source thumbnails are associated with which performance indicator thumbnails.

3. A method as recited in claim 1, each performance indicator thumbnail displaying a live graph identifying performance data for the associated performance indicator, and each data source thumbnail displaying a live graph of performance data of the associated data source, the data source being a component or resource of the computing device.

4. A method as recited in claim 1, further comprising synchronizing performance data displayed in a graph of the second portion, in a graph of one of the performance indicator thumbnails, and in a graph of one of the data source thumbnails.

5. A method as recited in claim 1, further comprising displaying in the second portion the additional data identifying one or more contributors to usage of the particular data source during the portion of time.

6. A method as recited in claim 1, the multiple performance indicators including a computation performance indicator, a storage performance indicator, and a memory performance indicator.

7. A method as recited in claim 1, further comprising displaying, in an additional window and in response to a finger or object hovering over one of the one or more data source thumbnails, additional data identifying contribution to usage of a particular data source by each of multiple contributors, the particular data source being the data source associated with the one of the one or more data source thumbnails.

8. A method as recited in claim 1, wherein the receiving the user selection of the portion of time comprises receiving a user input that is a gesture.

9. A method as recited in claim 1, wherein the additional data identifying one or more contributors to usage of a particular data source further comprises identifying how the one or more contributors are contributing.

10. A method as recited in claim 1, wherein each of the multiple performance indicators of the computing device is associated with a different color.

11. A method as recited in claim 10, wherein for one of the multiple performance indicators associated with a particular color, the performance indicator thumbnail associated with the one performance indicator is also associated with the particular color, and the data source thumbnails associated with the one performance indicator are also associated with the particular color.

12. A computing device comprising:
one or more processors; and
one or more computer-readable storage media having stored thereon multiple instructions that, when executed by the one or more processors of the computing device, cause the one or more processors to:
display, in a first portion of a computing device performance analysis user interface, one or more user-selectable live data source thumbnails associated with one of multiple performance indicators of the computing device, each of the one or more user-selectable live data source thumbnails displaying a live graph of performance data of the associated data source;
display, in the first portion of the computing device performance analysis user interface and concurrently with display of the one or more data source thumbnails, a user-selectable performance indicator thumbnail for each of the multiple performance indicators of the computing device, each performance indicator thumbnail displaying a live graph identifying performance data for the associated one of the multiple performance indicators;
display, responsive to receiving a notification of user-selection of one of the user-selectable live data source thumbnails, in a second portion of the computing device performance analysis user interface concurrently with the first portion, an analysis view for a data source of the user-selected one of the one or more live data source thumbnails, the selection performed in the first portion of the device performance analysis user interface, the analysis view displaying contribution to the data source usage by each of multiple contributors, the analysis view being synchronized with the user-selected data source thumbnail;
receive a user indication, input via the first portion of the device performance analysis user interface, of a region of interest; and
display an identification by simultaneously highlighting the region of interest in each of the live graph of performance data of the associated data source and each of the live data source thumbnails associated with one of the multiple performance indicators of the computing device in the first portion of the computing device performance analysis user interface and each of the analysis view for the data source of the one or more live data source thumbnails in the second portion of the computing device performance analysis user interface.

13. A computing device as recited in claim 12, the multiple instructions further causing the one or more processors to display, in the first portion of the device performance analysis user interface and concurrently with display of the one or more data source thumbnails, a user-selectable preset thumbnail, each preset thumbnail displaying a graph identifying performance for an attribute of a user-selected one of the one or more data source thumbnails.

14. A computing device as recited in claim 12, the multiple instructions further causing the one or more processors to update the graph of performance data displayed in each of the one or more data source thumbnails as the performance data changes over time while the device performance analysis user interface is displayed.

15. A computing device as recited in claim 12, wherein the user selection of the region of interest comprises a selection of a portion of time.

16. A computing device as recited in claim 12, further comprising displaying, in an additional window and in response to a finger or object hovering over one of the one or more data source thumbnails, additional data identifying contribution to usage of a particular data source by each of multiple contributors, the particular data source being the data source associated with the one of the one or more data source thumbnails.

17. A computing device as recited in claim 12, wherein identifying the region of interest comprises highlighting the region of interest.

18. A method implemented on a computing device, the method comprising:
displaying, in a first portion of a computing device performance analysis user interface, multiple user-selectable performance indicator thumbnails, each performance indicator thumbnail being associated with one of multiple performance indicators of the computing device and displaying a live graph identifying performance data for the associated one of the multiple performance indicators;

displaying, in the first portion of the computing device performance analysis user interface and in response to user selection of a performance indicator thumbnail associated with a performance indicator, one or more data source thumbnails associated with the performance indicator, each of the one or more data source thumbnails displaying a graph of performance data of an associated data source;

displaying, in a second portion of the computing device performance analysis user interface viewable concurrently with the first portion, an analysis view for a data source of a user-selected one of the one or more data source thumbnails, the data source selected through interaction in the first portion, the analysis view displaying contribution to the data source usage by each of multiple contributors, the analysis view being synchronized with the one or more data source thumbnails and with the multiple performance indicator thumbnails;

receiving a user indication, input via the first portion of the computing device performance analysis user interface, of multiple regions of interest; and displaying an identification by simultaneously highlighting of each of the multiple regions of interest in each of the multiple performance indicator thumbnails in the first portion of the computing device performance analysis user interface, each of the one or more data source thumbnails in the first portion of the computing device performance analysis user interface, and in a graph included in the analysis view for the data source in the second portion of the computing device performance analysis user interface.

19. A method as recited in claim 18, wherein the user identification of the multiple regions of interest is received via a time range displayed for the first portion.

20. A method as recited in claim 18, further comprising displaying, in the first portion of the device performance analysis user interface and concurrently with display of the one or more data source thumbnails, a user-selectable preset thumbnail, each preset thumbnail displaying a graph identifying performance for an attribute of a user-selected one of the one or more data source thumbnails.

* * * * *